(12) United States Patent
Guinness

(10) Patent No.: US 8,122,061 B1
(45) Date of Patent: Feb. 21, 2012

(54) SYSTEMS AND METHODS FOR INFORMATION MANAGEMENT USING SOCIALLY CONSTRUCTED GRAPHS

(76) Inventor: Robert Guinness, St. Louis, MO (US)

( * ) Notice: Subject to any disclaimer, the term of this patent is extended or adjusted under 35 U.S.C. 154(b) by 0 days.

(21) Appl. No.: 13/290,106

(22) Filed: Nov. 6, 2011

Related U.S. Application Data

(60) Provisional application No. 61/412,263, filed on Nov. 10, 2010.

(51) Int. Cl.
    *G06F 17/30* (2006.01)
    *G06F 17/20* (2006.01)
(52) U.S. Cl. .......................................... 707/802; 706/11
(58) Field of Classification Search .................. None
    See application file for complete search history.

(56) References Cited

U.S. PATENT DOCUMENTS

| | | | | |
|---|---|---|---|---|
| 5,487,135 | A * | 1/1996 | Freeman | 706/59 |
| 2009/0024590 | A1 | 1/2009 | Sturge et al. | |
| 2009/0082636 | A1 * | 3/2009 | Vallone | 600/300 |
| 2011/0178974 | A1 * | 7/2011 | Sayal et al. | 706/50 |

OTHER PUBLICATIONS

Dan Suthers, Arlene Weiner, Groupware for Developing Critical Discussion Skills, published in proceedings of CSCL '95 The first international conference on Computer support for collaborative learning (Learning Research and Development Center, University of Pittsburgh), Nov. 1, 1995, pp. 2, 4, 6.

\* cited by examiner

*Primary Examiner* — Tarek Chbouki
(74) *Attorney, Agent, or Firm* — American Patent Agency PC; Daniar Hussain; Albert Ho

(57) ABSTRACT

The present invention allows for an easy-to-use, web-based, schema-less database system that provides organizations the ability to organically model, store, and access information in an iterative and evolutionary manner. Users are encouraged to grow and explore the information domain intuitively. One embodiment is a method of collaboratively managing an entity-relationship database, including: displaying an entity-relationship graph to a first user, and creating a new relationship in the database in response to an input from said first user. Then, displaying an updated entity-relationship graph to a second user, and creating a second new relationship in the database in response to an input from the second user. Finally, assigning a voting weight to one or more relationships in the database in response to an input from a voting user, and disambiguating two or more relationships based on the voting weight from the voting user.

18 Claims, 13 Drawing Sheets

SYSTEMS AND METHODS FOR INFORMATION MANAGEMENT USING SOCIALLY CONSTRUCTED GRAPHS

REFERENCE TO RELATED APPLICATIONS

The present application is a non-provisional of and claims priority from provisional application U.S. Ser. No. 61/412,263, entitled "Simfo Information Management System," filed on Nov. 10, 2010, the entirety of which is hereby incorporated by reference herein.

FIELD OF THE INVENTION

The present disclosure relates to electronic information systems and in particular, a graph-based information system that provides for flexible, intuitive, and organic development of information models, including socially constructed graphs.

BACKGROUND OF THE INVENTION

The statements in this section merely provide background information related to the present disclosure and may not constitute prior art.

There exists a gap in current information technologies between spreadsheets and documents with their ease of use and flexibility—and relational databases with their organizational structure, configuration management, and query capabilities. A large number of users are managing a large portion of their information in spreadsheets and documents because of the relatively large investment required to develop and maintain a database. Many organizations never develop databases due to the expertise required to develop and manage a database. In other organizations, databases may exist for certain types of information, but for ad hoc and recently created/acquired information, the information is at least temporarily managed in documents and spreadsheets.

The present invention is directed towards lowering the investment barrier for information management systems by providing an intuitive and organically-built information management service that is both easy to use and flexible, yet capable of queries and configuration management normally associated with relational databases.

A similar gap exists in the domain of public knowledge bases, such as WIKIPEDIA and FREEBASE. For example, WIKIPEDIA lacks the relational structure and query capabilities of a database, whereas FREEBASE lacks the ease of use and flexibility of a spreadsheet or document tool. Thus, for society at large, there is lacking a comprehensive public database of information that the average Internet user is likely to contribute to in meaningful ways.

Effective and efficient management of information is key to the success of many complex endeavors, ranging from running a business enterprise to managing a large research and development project.

The technological solution described below to flexibly store this kind of information in a way that can be queried falls under the realm of graph theory, where information is organized into entities, and then relationships are built by combing entities with relations. As entities are linked into relationships, the resulting graph forms an interconnecting web of relational information, which is searchable via queries of these relationships.

It is against this background that various embodiments of the present invention have been developed.

BRIEF SUMMARY OF THE INVENTION

Accordingly, one embodiment of the present invention is a method of collaboratively managing an entity-relationship database. This method comprises the steps of displaying an entity-relationship graph showing a graphical representation of the entity-relationship database to a first user, said graph comprising a plurality of nodes representing entities stored in the entity-relationship database and a plurality of edges representing relations stored in said entity-relationship database, creating a new relationship in the entity-relationship database in response to an input from said first user, displaying an updated entity-relationship graph to a second user, creating a second new relationship in the entity-relationship database in response to an input from said second user, assigning a voting weight to one or more relationships in said entity-relationship database in response to an input from a voting user, assigning a credibility weight to the voting weight from the voting user based on an expert status of the voting user, and disambiguating two or more relationships based on said voting weight and said credibility weight.

Another embodiment is the method of collaboratively managing an entity-relationship database as described above, further comprising the step of calculating a relationship path between two entities stored in said entity-relationship database.

Another embodiment is the method of collaboratively managing an entity-relationship database as described above, wherein the relationship path is displayed on said entity-relationship graph as a chain of nodes and edges.

Another embodiment is the method of collaboratively managing an entity-relationship database as described above, wherein said input from said voting user is represented by an indication of the voting user's opinion about the relationship.

Another embodiment is the method of collaboratively managing an entity-relationship database as described above, further comprising the step of collapsing said entity-relationship database by replacing two or more relationships in the entity-relationship database with a single relationship.

Another embodiment is the method of collaboratively managing an entity-relationship database as described above, wherein said second new relationship represents a modification to said first new relationship.

Another embodiment is the method of collaboratively managing an entity-relationship database as described above, further comprising the step of displaying to an advertiser an ordered list of viewing users that have recent activity associated with a predetermined keyword, weighted by an importance weight of the keyword to the advertiser.

Another embodiment is the method of collaboratively managing an entity-relationship database as described above, further comprising the step of displaying to the advertiser a price to display an advertisement to each viewing user on the ordered list of viewing users, said price based on a market supply and demand for serving advertisements to said viewing users.

Another embodiment is the method of collaboratively managing an entity-relationship database as described above, further comprising the steps of receiving an input from the voting user indicating that the voting user would like to be designated as an expert, receiving credentials from said voting user to substantiate the voting user's expertise, assigning the credibility weight to the voting weight from the voting user based on the received credentials, and disambiguating two or more relationships based on said credibility weight and said voting weight.

Another embodiment is the method of collaboratively managing an entity-relationship database as described above, further comprising the steps of collecting expert data about the voting user's activity indicating that the voting user is an expert on a given topic, assigning the credibility weight to the voting weight from the voting user based on the expert data, and disambiguating two or more relationships based on said credibility weight and said voting weight.

Accordingly, one embodiment of the present invention is a computer system for collaboratively managing an entity-relationship database. This system comprises one or more memories for storing program code, one or more communication links to the entity-relationship database, and one or more processors, operatively connected to the one or more memories, for executing the stored program code. When the stored program code is executed, it causes the system to perform a process comprising the steps of displaying an entity-relationship graph showing a graphical representation of the entity-relationship database to a first user, said graph comprising a plurality of nodes representing entities stored in the entity-relationship database and a plurality of edges representing relations stored in said entity-relationship database, creating a new relationship in the entity-relationship database in response to an input from said first user, displaying an updated entity-relationship graph to a second user, creating a second new relationship in the entity-relationship database in response to an input from said second user, assigning a voting weight to one or more relationships in said entity-relationship database in response to an input from a voting user, assigning a credibility weight to the voting weight from the voting user based on an expert status of the voting user, and disambiguating two or more relationships based on said voting weight and said credibility weight.

Another embodiment is the computer system as described above, further comprising the step of calculating a relationship path between two entities stored in said entity-relationship database.

Another embodiment is the computer system as described above, wherein the relationship path is displayed on said entity-relationship graph as a chain of nodes and edges.

Another embodiment is the computer system as described above, wherein said input from said voting user is represented by an indication of the voting user's opinion about the relationship.

Another embodiment is the computer system as described above, further comprising the step of collapsing said entity-relationship database by replacing two or more relationships in the entity-relationship database with a single relationship.

Another embodiment is the computer system as described above, wherein said second new relationship represents a modification to said first new relationship.

Another embodiment is the computer system as described above, further comprising the step of displaying to an advertiser an ordered list of viewing users that have recent activity associated with a predetermined keyword, weighted by an importance weight of the keyword to the advertiser.

Another embodiment is the computer system as described above, further comprising the step of displaying to the advertiser a price to display an advertisement to each viewing user on the ordered list of viewing users, said price based on a market supply and demand for serving advertisements to said viewing users.

Another embodiment is the computer system as described above, further comprising the steps of receiving an input from the voting user indicating that the voting user would like to be designated as an expert, receiving credentials from said voting user to substantiate the voting user's expertise, assigning the credibility weight to the voting weight from the voting user based on the received credentials, and disambiguating two or more relationships based on said credibility weight and said voting weight.

Another embodiment is the computer system as described above, further comprising the steps of collecting expert data about the voting user's activity indicating that the voting user is an expert on a given topic, assigning the credibility weight to the voting weight from the voting user based on the expert data, and disambiguating two or more relationships based on said credibility weight and said voting weight.

Other embodiments of the present invention include systems having program code stored in memory and executed by a processor that cause the system to execute the methods described here. Yet other embodiments of the present invention include storage media storing program code thereon, which when loaded in a computer system cause the system to execute the methods described here. The computer systems and storage media used to execute the methods of the present invention include the computer systems known in the art, including those running various operating systems, and include various storage media known in the art, including optical storage, magnetic storage, and the like. Further embodiments of the present invention will become apparent from the detailed description of the invention and the accompanying drawings.

DETAILED DESCRIPTION OF THE INVENTION

Definitions

Figure 1:
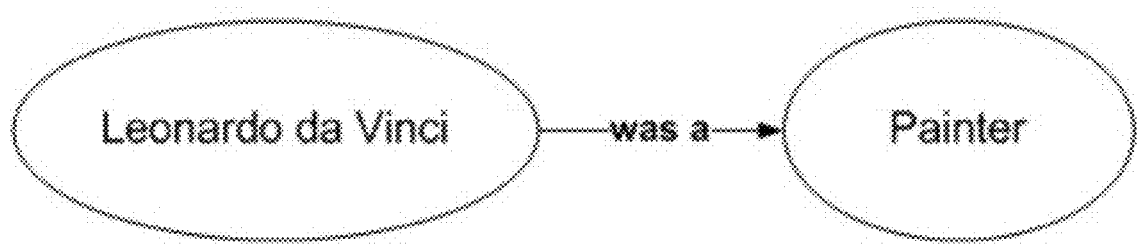
FIG. 1 illustrates an entity relationship graph with a single relationship, in accordance with one embodiment of the present invention.

As used throughout the specification and claims, the following concepts and phrases shall have the below defined meanings and their equivalents.

An entity is defined as anything (person, place, thing, or abstraction) that the user wishes to define in relation to other entities and represent as a character string or other electronic representation. Essentially, any word or phrase can become an entity, as well as numerical values. In addition, electronic files, such as a digital image, or other digital sets of information, can also be defined as entities.

A relationship (sometimes called an entity-relationship or entity relationship) is a statement relating two entities. For example, "Leonardo da Vinci is a painter," where "Leonardo da Vinci" is one entity and "painter" is a second entity. In other words, a relationship is a specific instance of two entities being linked by a particular relation (defined below). A general example of a relationship would be:

Entity A is linked to Entity B by Relation 1.

If Entity A is "an apple," Entity B is "fruit," and Relation 1 is "is a," then this relationship can more concisely and clearly be stated as "An apple is a fruit."

A relation is the part of the entity relationship statement that denotes the relation between the entities. For example, "is a" is the relation in the entity relationship "Leonardo da Vinci is a painter." A relation can be any link that can be made between two or more entities that the user wishes to impart a certain meaning. Other examples include "is a", "has a", "is located in," and "is a member of," or more specific relations like "is a citizen of," "was written by," and "is sold by".

An entity-relationship database comprises one or more entity relationships or equivalents, as described in the specification. Also called an entity relationship database. An entity-relationship database is a computer representation of an information model.

An entity-relationship graph is a graphical representation of an entity-relationship database. For example, FIGS. 1-5. A graph is a mathematical construct that comprises nodes connected by edges. Also called an entity relationship graph.

A relationship path is a path comprising a set of connected nodes and edges that connect two or more entities.

A voting weight is a weight assigned to a relationship by a voting user that represents the user's position or opinion concerning the relationship, which can be indicated as confirms, disputes, likes, dislikes, is a positive indicator, is a negative indicator or equivalents.

A position value is the relative importance, validity, approval level, preference, or other pre-determined metric of one relationship relative to another based on weights assigned by voting users, experts, or general users.

An expert is a user who has special expertise in a subject area.

An expert status designates a given user's expertise in a give subject area indicating that a user is an expert in a given subject area.

A credential is a piece of evidence that justifies an expert having expert status on a given topic.

A credibility weight is a weight assigned to a voting user's voting weight, based on the voting user's expert status, as supported by one or more credentials or as supposed by the voting user's activity in a given subject area or by some other means and the like. For example, a number between 0 and 1.

Disambiguating comprises the action of modifying the entity-relationship database to reduce or eliminate ambiguities, contradictions or apparent contradictions. Disambiguating also comprises the action of modifying the entity-relationship database to alter any weights, such as voting weights or credibility weights, assigned to relationships, in such a way that affects the entity-relationship graph or its representations. In one embodiment, disambiguating refers to a step of differentiating between two or more relationships that otherwise appear similar or have similar meanings, based on a predefined weight assigned to the relationships, including but not limited to the relationships' position value.

Collapsing comprises replacing two or more relations in an entity-relationship database with a single relationship based on the disambiguation. For example, the three relationships "Leonardo is a painter" and "Leonardo da Vinci is a painter" and "da Vinci is a painter" are replaced with the single relationship "Leonardo da Vinci is a painter." The relationships may be replaced in the database, or in the graphical representation only and not in the backend database.

An advertisement is information displayed to a viewing user paid for by an advertiser to advertise goods or services.

A keyword is a word that an advertiser links to an advertisement to be displayed when the word is associated with a viewing user.

An importance weight of the keyword is a weight corresponding to a value that the advertiser places on that keyword. For example, a number between 0 and 100%.

Introduction

One embodiment of the present invention is an easy-to-use, web-based, "schema neutral" database system that allows users and organizations to organically model, store, and access their information in exactly the way that they want to. In this context, "organically" means "in an iterative and evolutionary manner". Users of this system are not "locked down" into any particular schema while their data set and data model are immature. Rather, users are encouraged by the system to grow and explore their information domain in an intuitive way.

These characteristics are enabled by a number of features which will be described below; however, the flexible nature is enabled by employing a graph-based structure, based upon linking entities and relations into relationships, as defined above.

A constantly evolving schema is one result of the present invention. The system and associated applications are designed in a way that allows constant changes to the schema. In order to manage the challenge of many people editing a schema and most likely adding different and competing relationships, the system employs a "voting system" which gives higher visibility to more popular and "active" relationships. Also, by analyzing commonality in links between certain entities, the system suggests the appropriate relations to users. For example, if someone adds the relationship "Steve Jobs—worked at—Apple", and then another user adds "Steve Jobs—was employed by—Apple," the system is able to recognize that "worked at" and "was employed by" are nearly equivalent relations and suggest that the user use the more popular one (though the user will always have the choice to use whatever wording he/she wants).

Over time, certain types of entities will have developed a common set of properties, and they can be suggested to the user. So, for example, if a user adds a new recording artist, the system suggests the most common properties (i.e. relations) associated with recording artists. The user is never, however, limited to a fixed set of properties.

Relationships according to the present invention use natural, everyday language, rather than "database language" ("Steve Jobs worked at Apple." vs. "Steve Jobs→Employer: Apple"). This assists with developing human-readable text from the relationships stored in the system. It also makes for a more intuitive way of building information models. Users can start with existing text about a subject and start building a basic information model by extracting simple relationships from the text.

As described in more detail below, the system has a voting system used to promote (or demote) relationships in importance. The system can display relationships in priority or popularity order. Also, the system distinguishes between a user promoting a relationship because he/she finds it interesting vs. promoting it because he/she confirms it to be true. In the disclosed system, certain users could be identified as experts on certain topics, and therefore their confirmation of the validity of a relationship would give more value in promoting the veracity of a relationship.

Illustrative Examples of Entity Relationships

One way to illustrate a method of organizing information as described in this application is to provide examples. Let's start with another simple relationship as shown in the entity relationship graph of FIG. 1.

This statement is a generally known statement expressed in the form described above. "Leonardo da Vinci" is our first entity (in this case, a human entity). "Painter" is our second entity, and these two entities are related by the relation "was a" to create the relationship "Leonardo da Vinci was a Painter."

Figure 2:
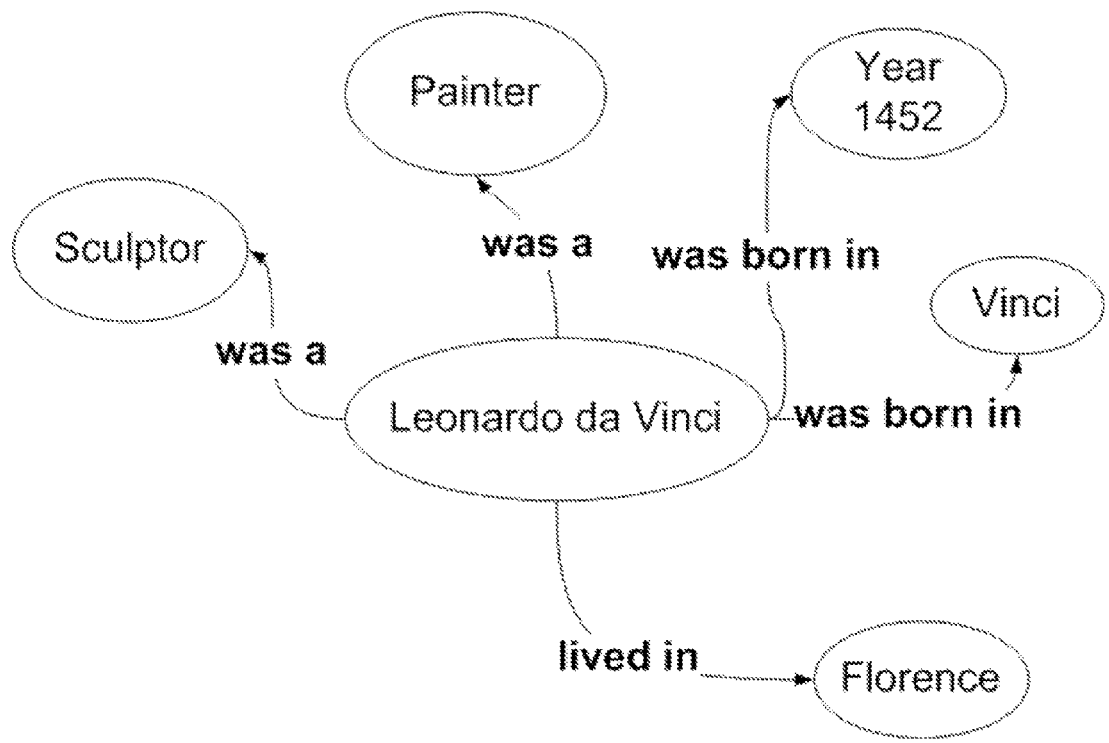
FIG. 2 illustrates a second entity relationship graph with a plurality of relationships, in accordance with one embodiment of the present invention.

Now let's build on this single relationship. What are some other things a user can say about Leonardo da Vinci? Some examples are shown in FIG. 2.

Figure 3:
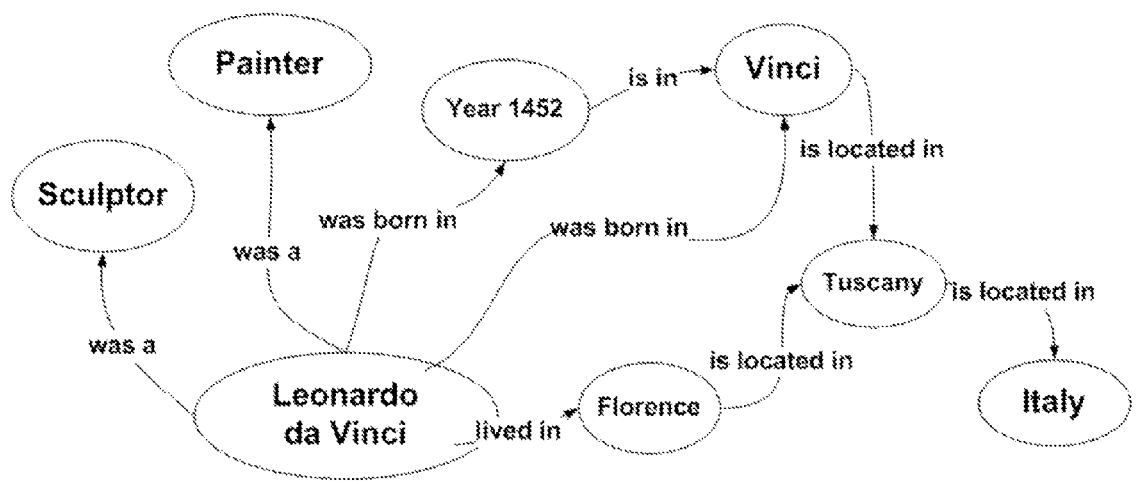
FIG. 3 illustrates a third entity relationship graph with a plurality of relationships, in accordance with one embodiment of the present invention.

As one can see, in addition to being a painter, he was also a sculptor, was born in year 1452 in Vinci, and he lived in Florence. We are beginning to build up the basic biographical information about Leonardo da Vinci. Let's go a little further as shown in FIG. 3.

Figure 4:
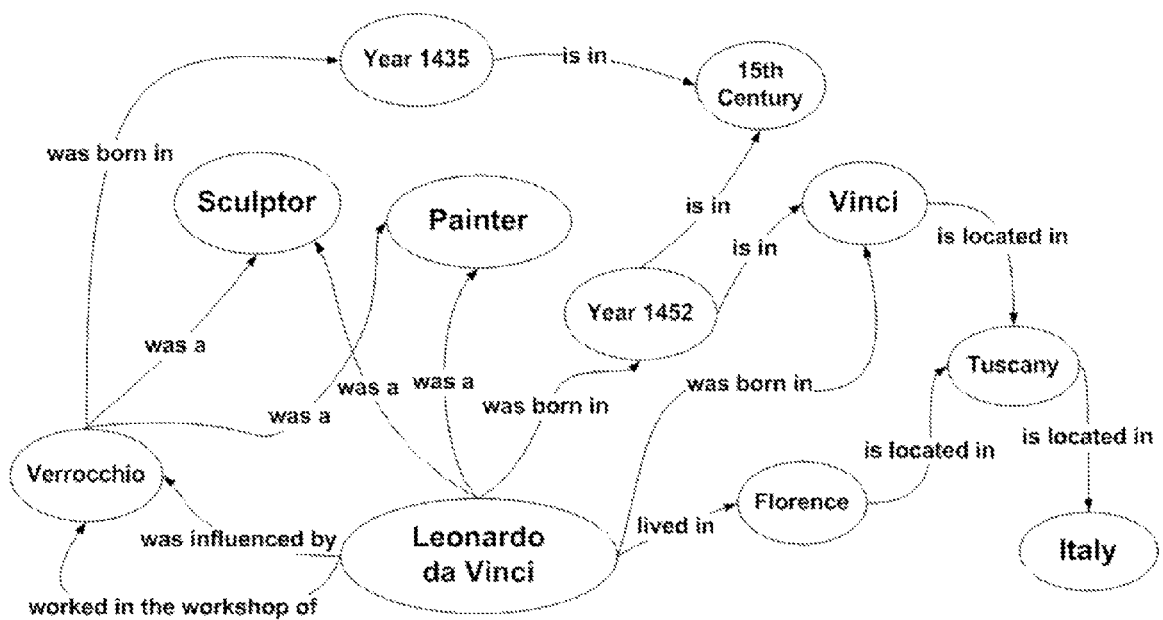
FIG. 4 illustrates a fourth entity relationship graph with a plurality of relationships, in accordance with one embodiment of the present invention.

Now in addition to the biographical information about Leonardo da Vinci, we have added some information about where Vinci and Florence are located. We now have an indirect link between Vinci and Florence, and we know they are both located in Tuscany, which is located in Italy. Let's go a step further as shown in FIG. 4.

Figure 5:
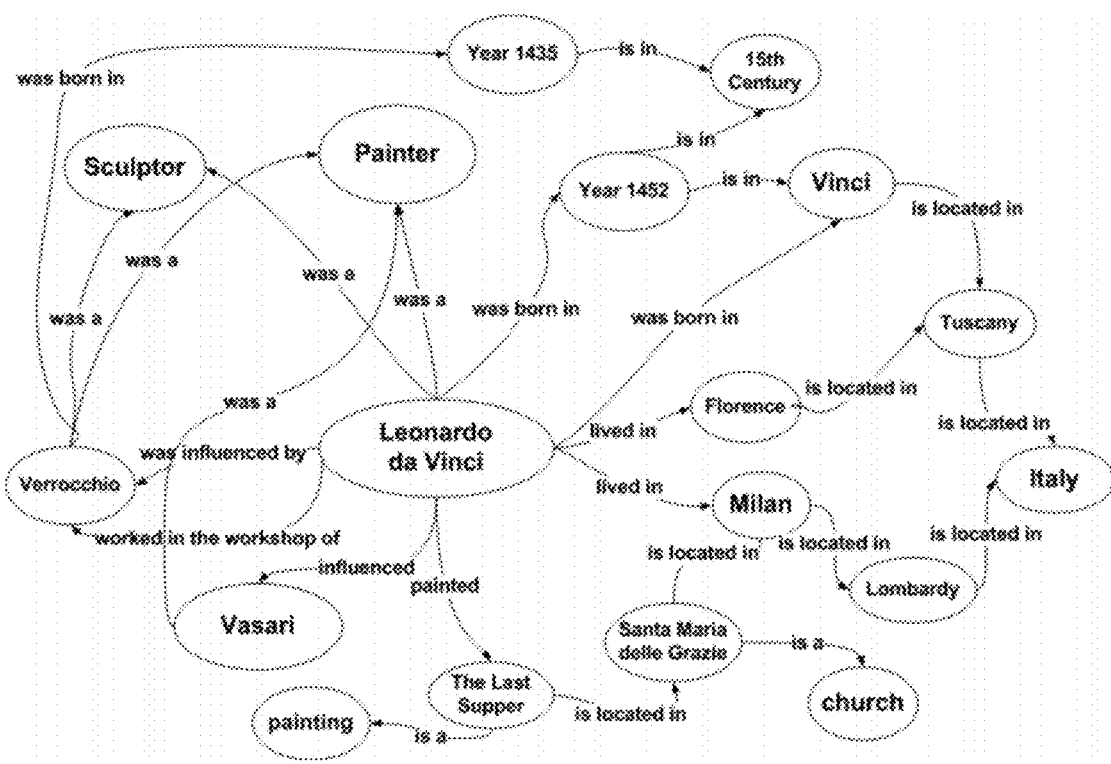
FIG. 5 illustrates a fifth entity relationship graph with a plurality of relationships, in accordance with one embodiment of the present invention.

Now we have added a second person, Verrocchio, who is related to Leonardo da Vinci by the fact that Leonardo worked in his workshop and he also influenced Leonardo (according to this information model). We know some additional info about Verrocchio, namely that he was also a painter and sculptor, and that he was born in year 1435. We also have added the additional fact that the years 1452 and 1435 are in the 15$^{th}$ Century. This is interesting because at this point we could query our information model to find out all the painters born in the 15$^{th}$ century. At this point our information model is very incomplete, and the result would be only two painters, but it is important that this possibility now exists. Let's go one step further as shown in FIG. 5.

Now we have added several other players to the picture, including a painter who Leonardo influences, a painting that Leonardo painted, and a church where the painting is located. We also find out that Leonardo also lived in Milan, which happens to also be the place where the church where his painting is located.

At this point it starts to be very difficult to legibly portray this entire information model on a single sheet of letter-sized paper, but a computer can easily store all this information within a small data volume.

The purpose of this example is to show how users could quickly and easily create an interconnected web of related information on any imaginable subject. The technical details of how the user will enter the information, how the information will be stored, and how it will be accessed are described below. The example is intended to demonstrate that as the volume and completeness of this interconnected information is increased, the value of the "information model" increases. After a certain critical mass is achieved, the information model becomes a useful reference for other users interested in similar subjects.

A representative example of a useful search query that a user could perform using the type of information described above would be, if you wanted to search for a list of Italian Renaissance painters, you could easily do that by searching for all the people linked to "is a painter," "lived in . . . Italy," and "was born in . . . " a certain range of years corresponding to the Renaissance movement. The methods and search technology described below will help the user to do that by typing in a single phrase, or maybe a small series of search terms. By contrast, for WIKIPEDIA to have this capability, a human would have to "manually" create an article with a list of Italian Renaissance painters with links to the articles about them.

The method and process for making these kinds of relationships through the World Wide Web along with a set of related features that allow and promote "crowd-sourcing" or community development of information models, resulting in a system for organic development of useful information models by users and organizations with little or no information technology expertise, form a novel structure and set of processes useful for managing information.

Description of One Embodiment of the User Interface

Figure 6:
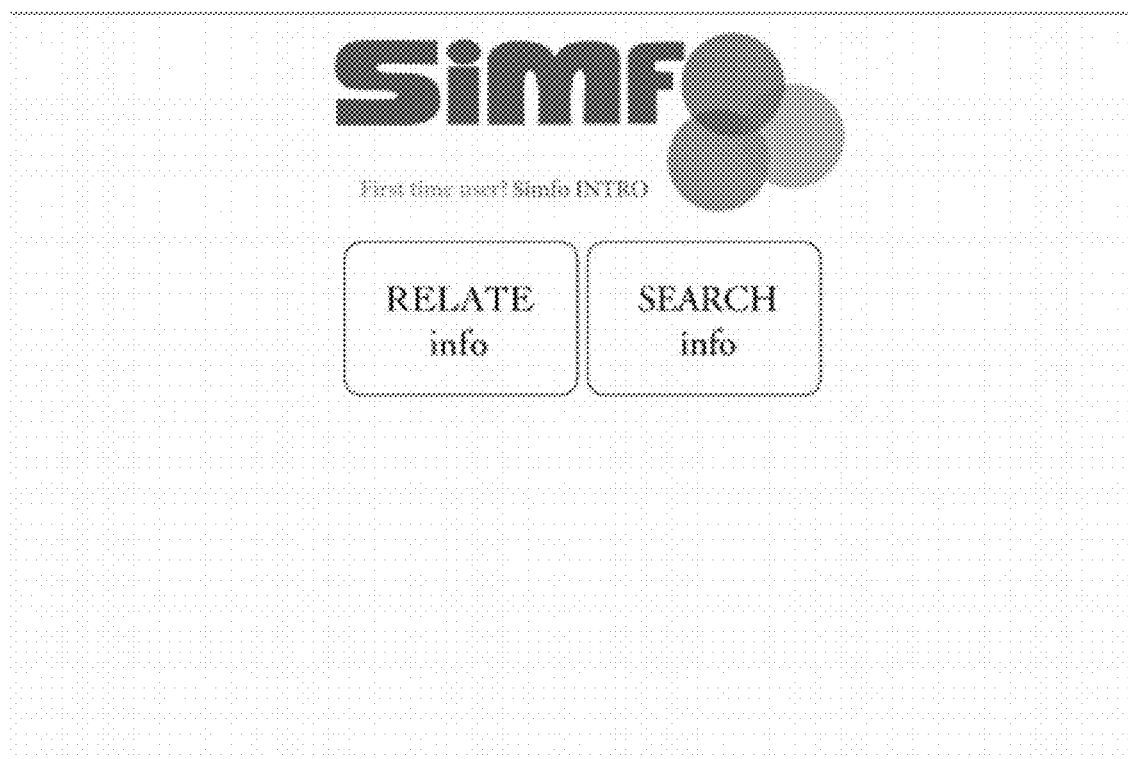
FIG. 6 illustrates one embodiment of the disclosed invention, showing a landing page where a user can either view a tutorial, or start to relate or search data.
Figure 7:
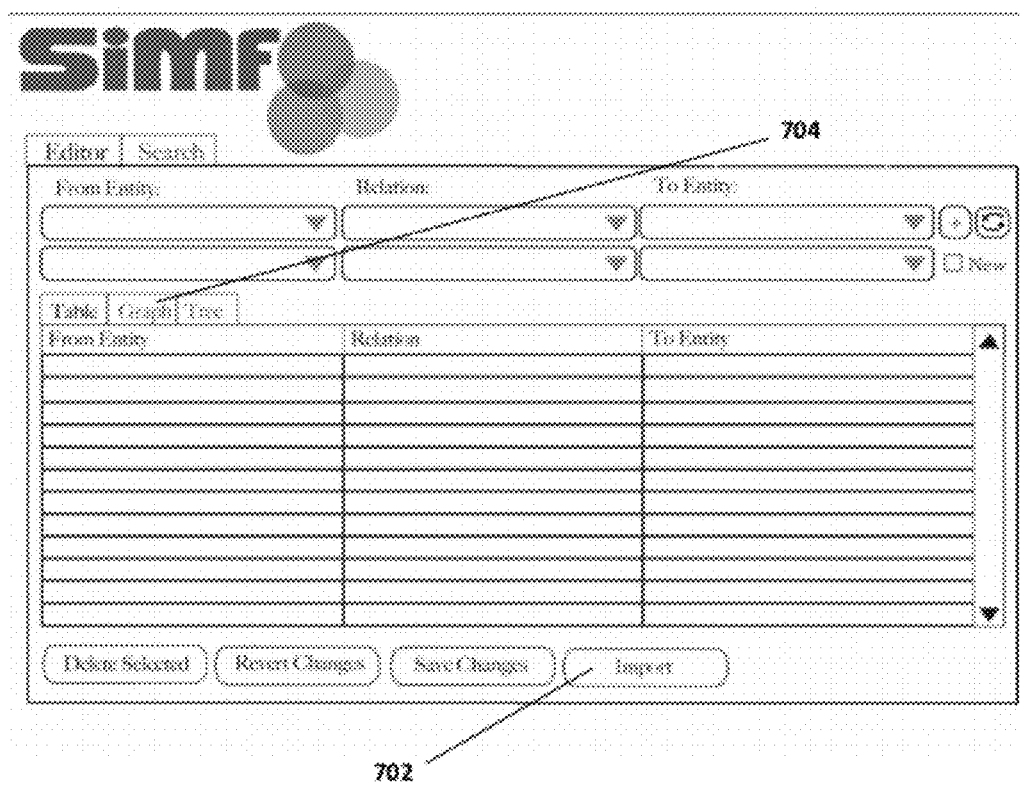
FIG. 7 illustrates one embodiment of the disclosed invention, showing an editor ("relate page").
Figure 8:
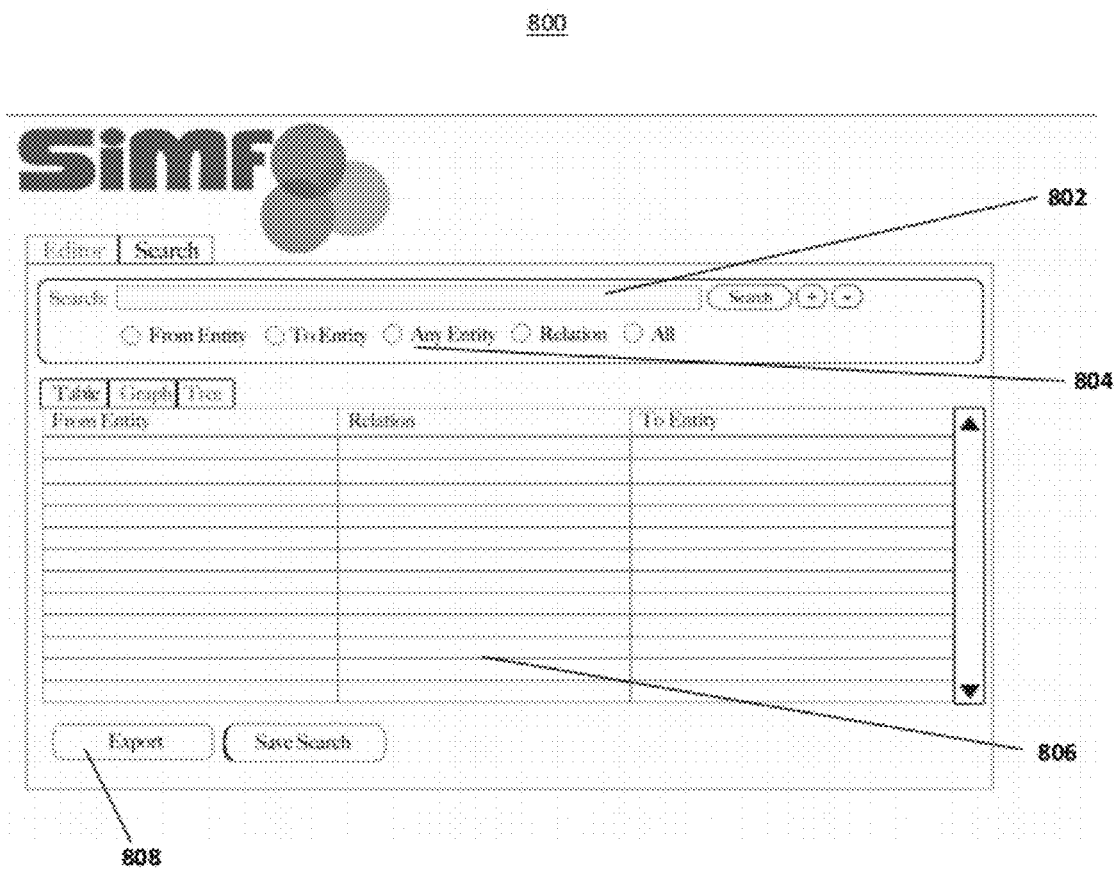
FIG. 8 illustrates one embodiment of the disclosed invention, showing a search interface ("search page"), view 1.
Figure 9:
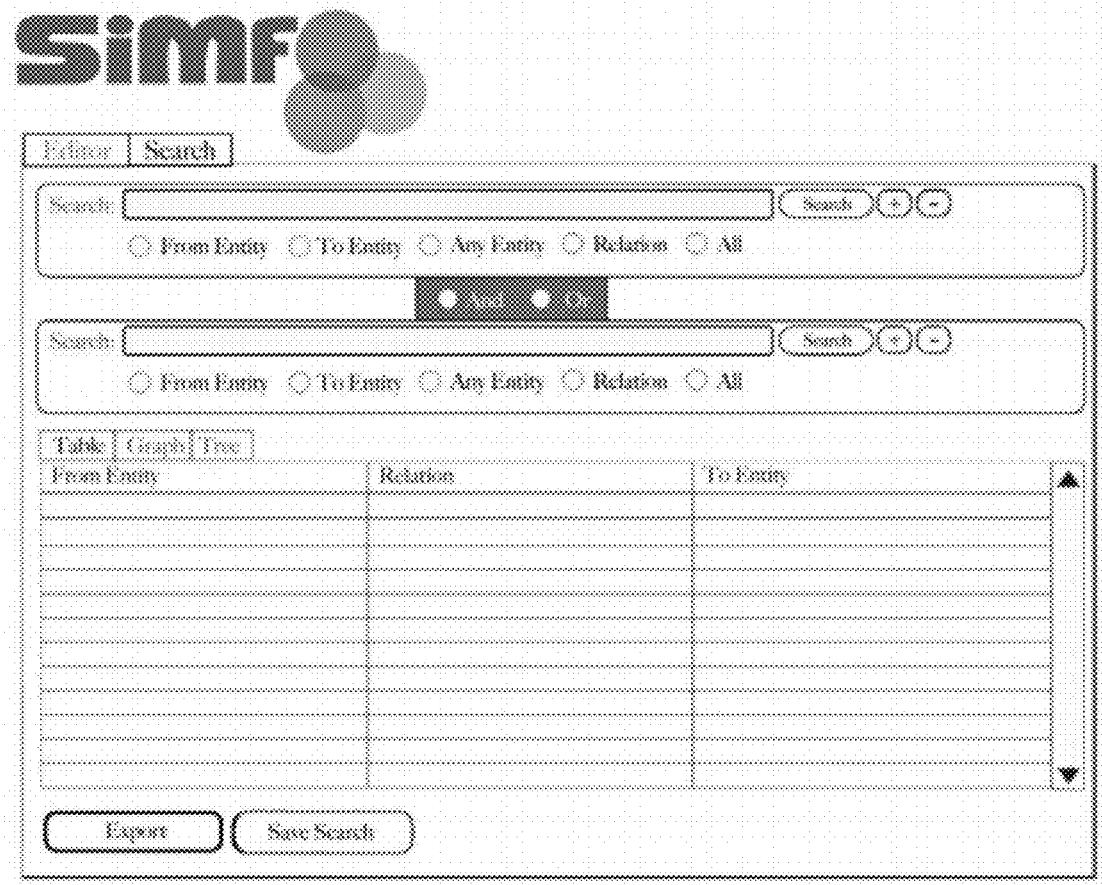
FIG. 9 illustrates one embodiment of the disclosed invention, showing a search page, view 2.
Figure 10:
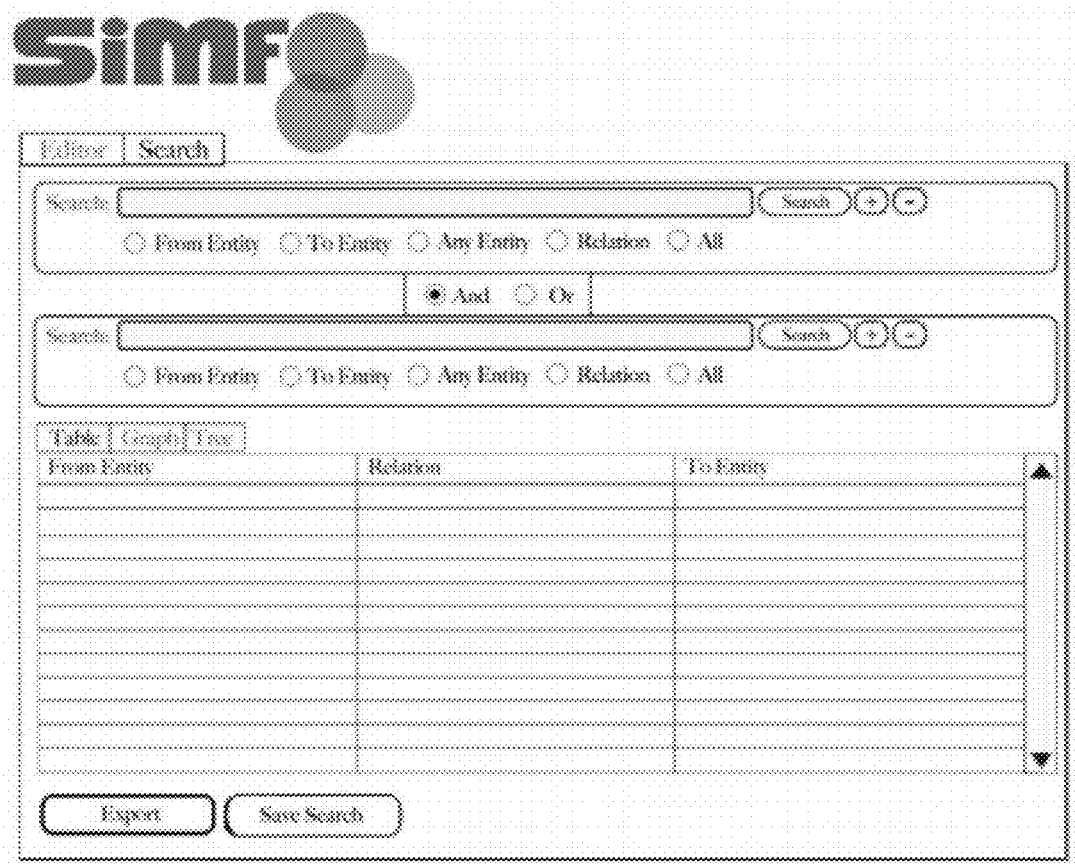
FIG. 10 illustrates one embodiment of the disclosed invention, showing a search page, view 3.

Let us now walk through a user experience of the present invention. First, a user sees a screen as shown in FIG. 6. After clicking "Relate," a user is taken to a screen as shown in FIG. 7. After clicking on "Search," a user is taken to a screen as shown in FIG. 8. FIG. 9 shows what the search screen should look like after the user has clicked the "+" button. The highlighting around the "And/Or" box is to remind the user to fill out whether the 2nd query refines or expands the search. FIG. 10 shows what the search screen should look like after the user has made the "And/Or" selection.

Basic Operations on Relationships

Figure 11:
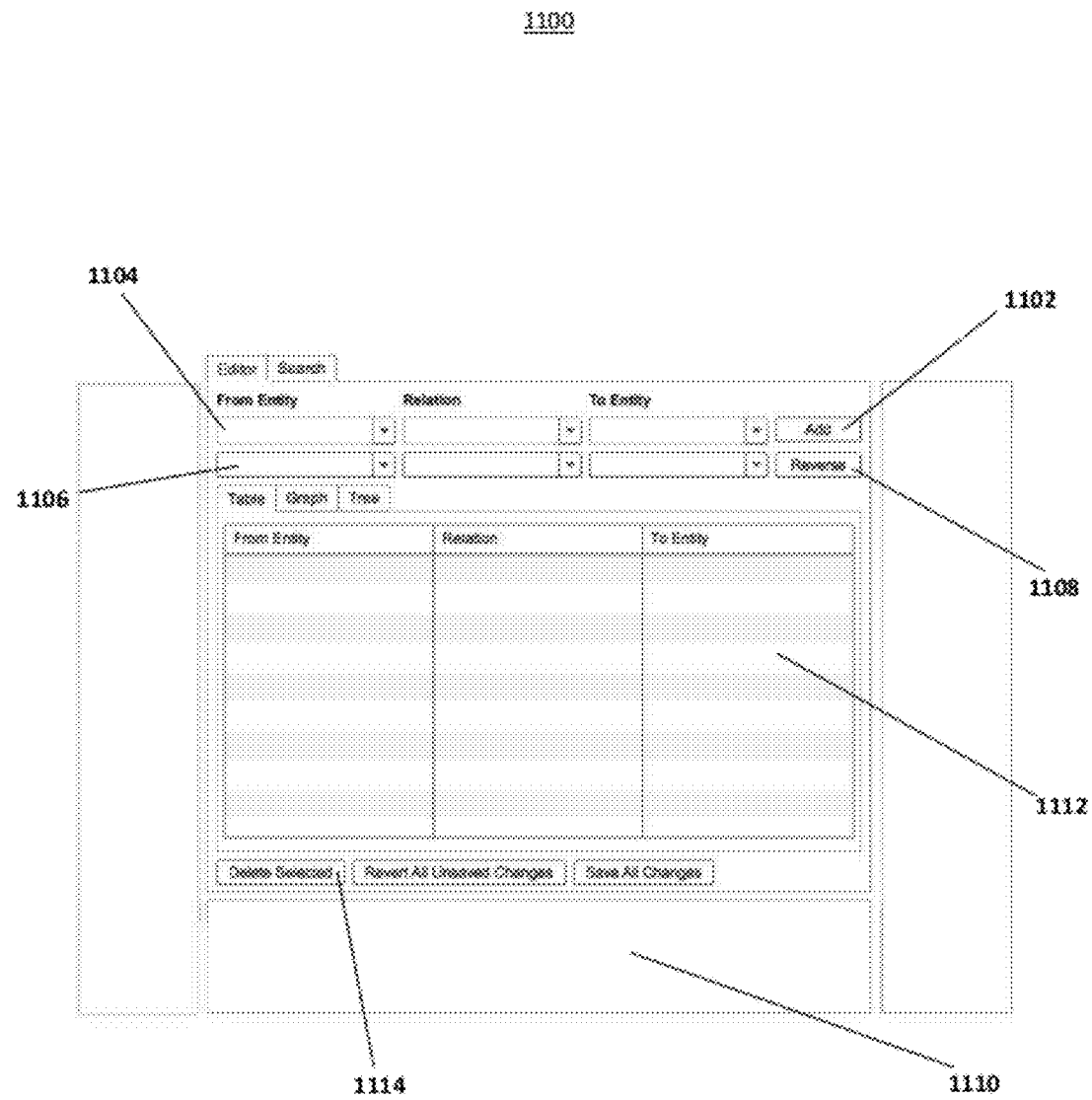
FIG. 11 illustrates an information management interface, in accordance with another embodiment of the disclosed invention.

The disclosed invention contains a process for adding relationships, through an interface accessed from the World Wide Web, comprising the following steps:
1. User enters relationship comprising fromEntity, relation, and toEntity and clicks an "Add" button, as shown in element 1102 of FIG. 11.
2. System determines if fromEntity, relation, and toEntity are already in the Entity table.
   If YES, then retrieve entity_id.
   If NO, then add to Entity table.
3. System stores entity_ids from relationship in relationships_id table and entity_names from relationship in relationships_names table.
4. System displays relationship in first row of relationships table. The relationship may be shown to a user in the table interface 1112. Previously entered relationships are shifted down a row accordingly.

The disclosed invention contains a process for modifying relationships, through an interface accessed from the World Wide Web, comprising the following steps:
1. User selects a relationship that he or she wants to modify from Entity table. This could be done by using a combo box as in interface element 1104.

2. The selected relationship is displayed in the combo boxes "From Entity", "Relation", and "To Entity." This could be shown to the user as in interface 1100.
3. User modifies any of the relationship components (From Entity, Relation, or ToEntity) and clicks "Add" button, as shown in interface element 1102.
4. System determines if modified fromEntity, relation, and toEntity are already in the Entity table.
5. System determines if fromEntity, relation, and toEntity are already in the Entity table.
   If YES, then retrieve entity_id.
   If NO, then add to Entity table.
6. System replaces original relationship with modified relationship in relationships_id and relationships_names tables.
7. System displays modified relationship in relationships table 1112, where original relationship was previously displayed.

The disclosed invention contains a process for deleting relationships, through an interface accessed from the World Wide Web, comprising the following steps:
1. User highlights one or more relationships in the relationship table (in user interface) and clicks "Delete Selected" button, as shown in interface element 1114.
2. System deleted the highlighted relationships from the relationship_ids and relationship_names tables.
3. Deleted relationships are removed from the relationships table 1112 in the user interface.

The disclosed invention contains a process for sorting relationships by "from entity", "relation", or "to entity", through an interface accessed from the World Wide Web, comprising the following steps:
1. User clicks on "From Entity" header in the relationships table in user interface.
2. System sorts the relationships in the relationship table in alphabetical order by "From Entity."
Similarly:
1. User clicks on "Relation" header in the relationships table in user interface.
2. System sorts the relationships in the relationship table in alphabetical order by "Relation."
Similarly:
1. User clicks on "To Entity" header in the relationships table in user interface.
2. System sorts the relationships in the relationship table in alphabetical order by "To Entity."

The disclosed invention contains a process for reversing entries in the "From Entities" and "To Entity" fields, through an interface accessed from the World Wide Web, comprising the following steps:
1. From the "editor" user interface, the user clicks the "reverse" button.
2. The system replaces the entry in the "To Entity" field with the entry in the "From Entity" field, and vice versa.

The disclosed invention contains a process for saving or committing changes to the entity-relationship database, through an interface accessed from the World Wide Web, comprising the following steps:
1. As the user makes additions or modifications to the entity-relationship database, the system tracks a history of these changes.
2. If the user clicks the button "Save Changes," then the system "commits" these changes to the database, or in other words resets the history log of changes since the last save.
3. If the user attempts to exit the system or has been inactive in the system for 10 minutes, then the system displays a dialog that says "You have unsaved changes to the information model. Would you like to commit these changes now?" followed by a summary of the changes, and a "Yes" and "No" button.
4. If the user selects "Yes" then the system commits the changes as in step 2. If the user selects "No" or does not respond within 5 minutes, then the history of changes is saved to the user's account. The next time the user logs into the system, the system will display a dialog saying "You have unsaved changes from your last session? Would you like to commit these changes?" followed by a summary of the changes, and a "Yes" and "No" button.
5. If the user selects "Yes" then the system commits the changes as in step 2. If the user selects "No" then the system reverts the changes made during the user's last session. If any of the changes affects changes already made by other users, then those revisions are disregarded. If the user does not make any choice after 5 minutes, then the history of changes is retained, and the dialog is re-displayed during the user's next period of activity.

The disclosed invention contains a process for organizing and displaying a set of relationships into text and allowing a user to rearrange and edit the relationships in the text, through an interface accessed from the World Wide Web, comprising the following steps:
1. User selects from a menu bar a menu item to "Compose text".
2. System displays an interface, where the user can select relationships for inclusion in the text.
3. When the user is finished selecting relationships, he or she clicks on a "next" button to proceed to the next step.
4. System displays an interface for arranging the relationships into text. In one panel is a list of the selected relationships. In a second panel, is a text editor. The interface allows the user to drag-and-drop relationships from one panel into a location in the text editor of the users' choice.
5. User drags desired relationships into the text editor panel into the desired positions. The user can also rearrange relationships that have already been dropped into the text editor, using a similar drag and drop method.
6. The interface also allows the user to edit the relationships as he or she desires. For example, the user can combine two relationships into a compound sentence, or form relationships into prepositional phrases.
7. Although the user may edit the relationship significantly, the system will track the fragments of text according to their original entity and relationship IDs. For example, if the name "Steve Jobs" is edited to "he", this instance of the word "he" will be tagged with the entity ID for "Steve Jobs". Likewise, if the relationship "Steve Jobs works at Apple" is edited to become "He has worked at the Apple Company for a total of 23 years," this sentence will be tagged with the relationship ID for the original relationship from which it was composed.
8. When the user is finished arranging and editing his or her text, he or she clicks on a "save" or "preview" button.
9. Clicking either button will result in the system displaying the final form of the text, as it will be viewed by other users. Clicking "save" will automatically save the text, whereas clicking "preview" will allow the user an opportunity to make further edits before saving by clicking an "edit" button.

Searching Relationships

The disclosed invention contains a process for searching for entities, through an interface accessed from the World Wide Web, comprising the following steps:
1. User types or selects an entity from the Search combo box 802.
2. User also selects whether he/she wants to limit search to either "From Entities", "To Entities" or "Both". This could be presented to the user as radio buttons 804.
3. System returns a table containing the results of the search. These results can be shown to the user in interface 800 via the table displayed in interface element 806.
    If only "From Entity" was selected, then the results will contain all the relationships where the search term is contained in the "From Entity".
    If only "To Entity" was selected, then the results will contain all the relationships where the search term is contained in the "To Entity".
    If "Both" was selected, then the results will contain all the relationships that have the search term in either the "From Entity" or "To Entity".

The disclosed invention contains a process for searching for a relation, through an interface accessed from the World Wide Web, comprising the following steps:
1. User types or selects a relation from the Search combo box.
2. System returns a table containing all the relationships where the relation contains the search term.

The disclosed invention contains a process for modifying relationships from search results, through an interface accessed from the World Wide Web, comprising the following steps:
1. User double-clicks on any of the three relationship components (fromEntity, relation, toEntity) from the table of results 806 of FIG. 8.
2. System displays an editable field for editing that component of the relationship.
3. System follows the process for modifying a relationship, as described above.

The disclosed invention contains a process for refining and organizing search results through an interface accessed from the World Wide Web. Once a user enters a search term or search terms and the system displays results, the user may wish to organize, filter, and refine these search results into a form more useful for him or her. This process is comprised of the following steps:
1. User enters a search term or set of search terms and clicks "search".
2. The system displays a set of search results (e.g. relationships) in a default sorted order (default can be set by the user).
3. The user can then perform any of the following operations to refine and organize the search results:
    a. Right-click on a relationship and select "Remove from Search Results". The system then removes this relationship from the search results, displaying a refined set of relationships.
    b. Drag a relationship to a different position in the search results. The system saves this new ordering, and it will be reflected even when a user navigates to another page in the search results and later returns to the original page.
    c. Filter the search results to contain only those relationships containing a particular search keyword.
    d. Filter the search result to remove all relationships that contain a particular keyword.
    e. Filter search results to show only relationships that have a certain "tag" associated with them.
4. Finally, the system allows the user to save or export the refined and reorganized search results, so that he or she can return to them at a later date, or use them in some form outside of the system.

Managing Categories

The disclosed invention contains a process for adding a "category" or grouping of entities, through an interface accessed from the World Wide Web, comprising the following steps:
1. User adds a new relationship with the following properties:
    relation="is a"
    toEntity="category" or "Category" (i.e. this should not be case sensitive).
2. System determines if category already exists by searching the fromEntity from the category singular and category_plural fields of the categories table.
    If YES, then system displays a pop-up dialog that says "Category already exists."
    If NO, then system displays a pop-up dialog that says: "You are attempting to add a category. Please indicate the singular and plural forms."
    The dialog has an entry field for entering the singular and plural forms of the category title, and the system should make a reasonable guess of whether the user has entered the singular form or plural form by searching for an "s" at the end of the string. (e.g. if user entered "artist is a category", then the singular field would be populated with the word "artist", but is the user had entered "artists is a category", then the plural field would be populated.)
3. System adds the singular and plural forms of the category to the categories table.
4. System creates a new table named after the plural form of the category with fields entity_id and entity_name.
5. System adds the plural form of the category to the category drop-down lists below "From Entity" and "To Entity" combo boxes.

The disclosed invention contains a process for filtering entities by "category" or grouping of entities, through an interface accessed from the World Wide Web, comprising the following steps:
1. User selects from a category drop-down box (either under "From Entity" combo box or "To Entity" combo box) a category.
2. System filters the appropriate combo box to contain only entities that are members of that category.

The disclosed invention contains a process for adding an entity to a "category" or grouping of entities, through an interface accessed from the World Wide Web, comprising the following steps:
1. User adds a new relationship, where the relation is one of the relations that has been specified as a categorizing relation (for example, in some embodiments "is a," "is an," "was a," "was an" are specified as categorizing relations).
2. System determines if toEntity is in the category singular field of the Categories table.
    If YES, then entity_id and entity_name of fromEntity are added to the table with the appropriate category name.

If NO, then system displays a dialog saying, "Do you want to add [toEntity] as a new category of entities?"
If user selects YES, then execute process for adding a new category.
If user selects NO, then execute normal process for adding a new relationship.

Exporting and Importing Data

The disclosed invention contains a process for exporting search results to a comma-delimited file, through an interface accessed from the World Wide Web, comprising the following steps:
1. User clicks on "Export Search Results" button 808 of FIG. 8.
2. System generates the results as a comma-separated file (CSV) and prompts the user to save to his/her computer.

The disclosed invention contains a process for importing relationships from a comma-delimited file, through an interface accessed from the World Wide Web, comprising the following steps:
1. User clicks on "Import Relationships" button 702 of FIG. 7.
2. System displays a dialog for uploading a CSV file that contains relationships in the format "from Entity, relation, toEntity".
3. System reads each line in the uploaded file, and if the line has the correct format (i.e. three strings separated by commas), then the line is added as a new relationship according to the process described above.

The disclosed invention contains a process for creating relationships from a spreadsheet with headers, through an interface accessed from the World Wide Web, comprising the following steps:
1. User clicks on "Import Relationships" button 702 of FIG. 7.
2. System displays a dialog for user to select the file from which he/she would like to import relationships.
3. If the file is a spreadsheet containing headers, then an import wizard is activated.
4. The import wizard then guides the user through each column of data, pre-populating the "From Entity", "Relation", and "To Entity" fields based on the column and row headers and cell contents.
5. The user is asked by the system to confirm the proper interpretation of the headers and is given the opportunity to modify them as desired.
6. When the user has finished going through and confirming each header's proper interpretation, the system then creates the chosen relationships based on the contents of the spreadsheet.

Discovering Relationships Automatically

The disclosed invention contains a process for discovering relationships from a text document, through an interface accessed from the World Wide Web, comprising the following steps:
1. User clicks "Extract Relationships" button.
2. System displays a dialog for the user to select whether he would like to paste text into the website interface or load text from a text document file (.doc, .pdf, .txt, etc.).
If user chooses "paste text", then an input box is displayed for the user to paste in the text from which he/she would like to extract relationships.
If user chooses "load text from file," a dialog is displayed for the user to choose the file from which he/she wishes to extract relationships.
3. Once the desired text has been loaded into the system, the system will analyze the text to find matches to entities and relations that already exist in the system.
4. For words and phrases that were not found to exist in the system, a dialog will be displayed where the user can identify if each word or phrase should be added as:
A) A new entity
B) A new relation
Or the user can select "Do not import" for words or phrases that the user does not wish to be used in the system.
5. The system displays all of the relationships that are created from the auto-matching and user-inputted items.
6. The user confirms that these relationships should be added to the system by checking (or unchecking) checkboxes next to the relationships.

Managing Hierarchies

The disclosed invention contains a process for arranging entities into hierarchies, through an interface accessed from the World Wide Web, comprising the following steps:
1. User clicks "Add new hierarchy" button.
2. System displays a dialog for the user to enter a name for the new hierarchy.
3. System displays an interface for adding entities to the newly created hierarchies. The interface has two panels. On the left the newly created hierarchy is shown. On the right, a list of the available entities to add to the hierarchy is shown, along with a category drop-down list to filter the entities, and a search bar (to filter by search query for entities). Also, there is a button to add new entities.
4. User selects entities from the right panel to add to the newly created hierarchy.
5. After entity is selected, system displays it as part of hierarchy on the left panel, along with a button to add a "child" to the entity in the hierarchy. System also displays buttons to move entities in the hierarchy "up" or "down" one level in the hierarchy. If entity is already at the highest or lowest level in the hierarchy, then the respective button will be displayed as inactive. Lastly, the system will also display a button to delete the entity from the hierarchy.

The disclosed invention contains a process for navigating through hierarchies, through an interface accessed from the World Wide Web, comprising the following steps:
1. System displays a hierarchy of entities (as created in process above) with right-facing triangles for those entities which have children entities.
2. User clicks on the right-facing triangle for an entity that has children to expand the hierarchy view for the selected entity.
3. System changes right-facing triangle to a down-facing triangle, indicating that the selected entity's children entities are displayed. System also inserts a list of the selected entity's children. The presence of the selected entity's children will be indicated by a right-facing triangle. System displays in a panel to the right of the hierarchy of entities a list of relationships that are connected to the selected entity.
4. User selects one of the children of the previously selected entity from the expanded hierarchy view.
5. System displays in a panel to the right of the hierarchy of entities a list of relationships that are connected to the selected child entity.
6. User clicks on the down-facing triangle for the entity to collapse the display of that entity's children.
7. System hides the children of the selected entity, changes the down-facing triangle to a right-facing triangle, and changes the information in the right panel to a list of relationships related to the originally selected entity.

Numerical Inputs

The disclosed invention contains a process for detecting units of measurement indicated in the entity field and converting between related units, through an interface accessed from the World Wide Web, comprising the following steps:
1. User enters into a "From Entity" or "To Entity" field a numerical value followed by a text string. For example, "10 kg" or "2 m".
2. System checks the text string against a table of text strings representing units.
3. If the system detects a match, then the system displays a dialog that says "Do you want to enter the [From Entity/To Entity] as a measurement unit?" followed by a "Yes" or "No" button.
4. If the user selects "Yes", then the system displays the full name and type of measurement unit that it has interpreted from the user's input and asks the user to confirm the interpretation. For example, if "2 m" was the user's entry, then the system would display "2 meters (length)". If the user selects "No", then the system records the entity as a character string exactly as the user entered it.
5. If the user selected "Yes" and the user confirms the interpretation, then the entity is saved in the system along with an additional property indicating that the entity contains a measurement unit.

The disclosed invention contains a process for searching between a numerical range of numerical values, through an interface accessed from the World Wide Web, comprising the following steps:
1. User clicks "Search Numerical Range" button.
2. System displays a search interface similar to the one described above, but between the "relation" and "To Entity" fields there is a drop-down menu to select the operators "=", "<", or ">".
3. If the user selects "<" the system displays an additional button that says "But >". If the user selects ">" the system displays an additional button that says "But <".
4. If the user clicks the "But >" or "But <" button then the system displays an additional entry field to the right of the button.
5. The system then evaluates the search criteria based on the range selected by the user and displays the results similarly in a process similar to the one described above for other search queries.

The disclosed invention contains a process for generating suggested search queries, based on the user's input, through an interface accessed from the World Wide Web, comprising the following steps:
1. User enters a search term which does not exactly match any of the entities in the Entities table, but exhibits a high degree of similarity to one or more entities.
2. System displays the text "Did you mean" followed by the entity with the highest degree of similarity to the search term entered by the user, followed by a question mark. The suggested entity should contain a hyperlink.
3. If the user clicks on the hyperlink of the suggested entity, then the system performs a search query using the suggested entity.
4. The system displays the search results in the user interface.

Voting, Disambiguating and Collapsing

In some embodiments of the disclosed invention, the invention contains a process for a voting user to indicate that a particular relationship is valid or "confirmed," thereby generating a voting weight (which can be a positive or negative position value as described below), through an interface accessed from the World Wide Web, comprising the following steps:
1. In such embodiments of this invention, the system will display next to each displayed relationship a "Confirm" button.
2. If user clicks on the "Confirm" button next to a particular relationship, then this is interpreted by the system as the user indicating that he or she believes this relationship is valid or "confirmed" by him/her. The system therefore stores the user's ID in a "confirmed by" property associated with that particular relationship.

In some embodiments of the disclosed invention, the invention contains a process for a voting user to indicate that they are interested in a particular relationship or entity, thereby also generating a voting weight, through an interface accessed from the World Wide Web, comprising the following steps:
1. In such embodiments of this invention, the system will display next to each displayed relationship or entity a "Like" or "Follow" button.
2. If user clicks on the "Like" or "Follow" button next to a particular relationship or entity, then this is interpreted by the system as the user indicating that he or she is interested in this relationship or entity. The system therefore stores the user's ID in a "liked by" or "followed by" property associated with that particular relationship or entity.

In some embodiments of the disclosed invention, the invention contains a process for sorting relationships by the number of times "confirmed" or the number of times "liked/followed," or some combination of these two numbers, through an interface accessed from the World Wide Web, comprising the following steps:
1. In such embodiments of this invention, the system will display next to the relationship table, an option to sort the relationships by number of times "confirmed" or by number of times "liked/followed."
2. If the user selects the option "Sort by Confirmations", the system determines the number of times each relationship has been "confirmed" and then re-displays the relationships in order from most confirmations to least confirmations. If the user selects the option "Sort by Likes/Follows", the system determines the number of times each relationship has been "liked" or "followed" and then re-displays the relationships in order from most number of "likes/follows" to least number of "likes/follows". In some embodiments of this invention, the system will display an option to "Sort by Popularity." With this option, the system uses a combination of the above two metrics in determining the popularity of each relationship.

The disclosed invention contains a process for users to indicate that relations are equivalent or highly similar in meaning, through an interface accessed from the World Wide Web, resulting in a system that can group together disparate relationships of equivalent or highly similar meanings, comprising the following steps:
1. User selects two or more relationships (using control or shift to select multiple relationships).
2. User right-clicks on any of the selected relationships.
3. System displays a dialog box with an option to "Mark selected as highly similar or equivalent."
4. System displays a pop-up dialog box that says:
5. "You have chosen to mark the following relationships as being highly similar or equivalent in meaning. This action will link these relationships and under normal circumstances, only the most popular one will be displayed. Which of these relationships do you feel is the preferred one?"
6. This will be followed by a list of the selected relationships with a radio button style selection and buttons to confirm or cancel the selection.
7. User selects the preferred relationship and clicks confirm (or cancel).
8. System closes the dialog box and stores the action in the database. The action is stored as an association between the selected relationships with one relationship identified as the preferred relationship. Other ancillary information, such as the user ID of the user who created the association and the time and date of the association, are also stored.

The disclosed invention contains a process for users to identify entities and relations that have an equivalent or highly similar meaning in another language (also indicated by the user), through an interface accessed from the World Wide Web, resulting in a system that can group together disparate text strings of equivalent or highly similar meanings and the associated language to which they belong, comprising the following steps:
1. User selects two or more relationships or entities (using control or shift to select multiple relationships).
2. User right-clicks on any of the selected relationships or entities.
3. System displays a dialog box with an option to "Mark selected as translations."
4. System displays a pop-up dialog box that says:
5. "You have chosen to mark the following relationships or entities as having highly similar or equivalent meanings in two or more languages. This action will link these relationships or entities as translations. Please confirm or identify the language of each of the relationships or entities below."
6. This will be followed by a list of the selected relationships or entities with a combobox to identify the language of the relationships or entities. The system will attempt to detect the language, based on a third-party language detection algorithm. If the system is unable to detect the language, the combobox will be set to "Choose language."
7. User adjusts or identifies the languages of the displayed relationships or entities and clicks "confirm" (or "cancel" to cancel the action).
8. System closes the dialog box and stores the action in the database. The action is stored as a translation association between the selected relationships or entities with the identified language of the relationships or entities stored as well. Other ancillary information, such as the user ID of the user who created the association and the time and date of the association, are also stored.

In some embodiments of the disclosed invention, the invention contains a process for disambiguating the entity-relationship database to reduce or eliminate ambiguities, contradictions or apparent contradictions. Disambiguating can also include the action of modifying the entity-relationship database to alter any weights, such as voting weights or credibility weights, assigned to relations, in such a way that affects the entity-relationship graph or its representations.

In some embodiments of the disclosed invention, the invention contains a process for collapsing two or more relations in an entity-relationship database into a single relation based on the disambiguation. For example, the three relations "Leonardo is a painter" and "Leonardo da Vinci is a painter" and "da Vinci is a painter" are replaced with the single relation "Leonardo da Vinci is a painter." In one embodiment, the three relationships are all stored in the database, but only one relationship is displayed to the user, along with an indication that alternative versions of the relationship exist.

Entity Relationship Graph or "Graph View"

The disclosed invention contains a process for viewing relationships in a graph representation, known as an entity relationship graph, also known as "graph view," through an interface accessed from the World Wide Web, comprising the following steps:
1. User clicks on "View as graph" button 704 of FIG. 7.
2. System displays the relationships as a graph, where entities are enclosed in a circle or other shape, and the relations are written along lines connecting to other entities.

The disclosed invention contains a process for zooming in or out in the entity relationship graph, panning left, right, up, or down, and centering on a particular entity, through an interface accessed from the World Wide Web, comprising the following steps:
1. When in "graph view," the system displays a graph representation of the entity-relationship database in an interface to zoom and pan the entity relationship graph.
2. If user selects "zoom out", then zoom out, modifying the size of the shapes and text, and displaying additional relationships.
3. If user selects "zoom in", then zoom in, modifying the size of the shapes and text and displaying fewer relationships.
4. If user selects "pan up", then pan the graph up.
5. If user selects "pan down", then pan the graph down.
6. If user selects "pan left", then pan the graph to the left.
7. If user selects "pan right", then pan the graph to the right.

The disclosed invention contains a process for toggling between "graph view" and "table view," through an interface accessed from the World Wide Web, comprising the following steps:
1. When the system is in "graph view" mode, the user right-clicks on a particular entity or relation and selects from the menu "switch to table view."
2. The system performs a query on the selected entity/relation which results in a list of the relationships in which the entity/relation is a member and displays the list in a table format.
3. When the system is in "table view," the user right-clicks on a particular entity or relation and selects from the menu "switch to graph view."
4. The system displays the graph representation of the entity/relation, with all the entities/relations connected to the selected entity/relation, and the selected entity/relation at the center of the graph.

The disclosed invention contains a process for navigating "forward" and "backward" through "entity links" in an entity relationship graph having a "hybrid view" showing both graphical and non-graphical representation of the entity-relationship database, through an interface accessed from the World Wide Web, comprising the following steps:
1. User selects "hybrid view" from either the editor or the search results screen.
2. The system displays the same set of relationships as shown in the previous view, but in the "hybrid view" format.
3. If the user wants to navigate "forward" in the relationship graph, he or she selects one of the right arrows shown after each entity.

4. The system then displays all of the relationships where the "From Entity" is the selected entity (i.e. the entity next to the right arrow that was clicked).
5. If the user wants to navigate "backward" in the relationship graph, he or she selects one of the left arrows shown before the "From Entity".
6. The system then displays all of the relationships where the "To Entity" is the selected entity (i.e. the entity next to left arrow that was clicks).
7. In this way, the user can continue navigating "forward" or "backward" through as many different entities as desired.

Entity Relationship Paths

The disclosed invention contains a process for determining and listing the entity relationship paths (also known as "routes") of connections between any two given entities, through an interface accessed from the World Wide Web, comprising the following steps:
1. The user selects two particular entities (holding the control key to select multiple entities), then right clicks on either of the two selected entities, and finally selects from the menu "Connections between entities."
2. The system then calculates the routes of connections between the two entities (i.e. the paths of entities/relations connecting the two entities). This process should time-out after it has reached 1000 routes or 10 seconds, whichever comes first.
3. The system then sorts the routes from least number of entities/relations in the route to most number of entities/relations in the route and displays them to the user interface in that order.

Custom Views

The disclosed invention contains a process for allowing the user to create "views," which are custom displays of specific relationships, created through an interface accessed from the World Wide Web, comprising the following steps:
1. The user clicks on the "Create View" button.
2. The system displays a blank "canvas" and a "palette", which is a group of controls/widgets that the user can "drag and drop" onto the canvas.
3. The palette has controls, such as "table view", "graph view", "hierarchy tree", "search bar," and other widgets that provide similar functionalities to those described in this document. When the user selects any of these controls/widgets and drags them onto the canvas, a "wizard" is displayed by the system, which guides the user through the process of identifying which information should be displayed in the control/widget.
4. When the wizard is displayed, the user selects which information should be displayed by the control/widget. For example, if the user would like the widget to display in table view all of the relationships containing a certain entity, the user would choose from a drop-down "show entity" and type in the entity name, and then select "show all relationships".
5. The system will also provide the capability for the user to reposition and resize the controls/widgets that are dropped onto the canvas, in order for the user to achieve the desired layout.
6. Once the user has completed the design of the custom view, he or she can save the view by clicking the "save view" button.

Tagging Relationships

The disclosed invention contains a process for "tagging" relationships or entities, through an interface accessed from the World Wide Web, comprising the following steps:
1. User types a string into combobox next to a relationship or entity, marked "Add Tag," and presses enter.
2. System stores the string (e.g. a word or phrase) into a database with the associated relationship ID or entity ID, as applicable.
3. If the string entered by the user is a valid username for a user in the system, then the system also stores the user ID of the tagged user.
4. In a separate interface, there is a combo box or list of tags. The user selects a specific tag from either the combo box or list of tags.
5. The system displays a list of relationships or entities that have been tagged with the selected tag.

Advertisements

The disclosed invention contains a process for displaying advertisements based on a user's activity in the system. The purpose of this process is to allow advertisers, both large and small, to target ads to specific users, based on their recent activity, which likely is a reflection of the users' current interests. At the same time, the process is designed to protect the privacy of the users. For example, it does not require the direct sharing of the names, email addresses, location, or even the unique ID number of the users with the advertisers. Rather, the system shares aggregate statistics concerning the activity of users of the system. By "activity" we mean the following set of actions that a user can perform in the system that involve "interacting" with entities, including, but not limited to:
1. Entering a search term containing an entity
2. Creating a relationship containing an entity
3. Confirming a relationship containing an entity
4. Disputing a relationship containing an entity
5. Following an entity
6. Viewing an entity's page
7. Viewing a relationship's page containing an entity For each of these actions, the system should store a record of the action, the user ID of the user that performed the action, the entity ID of the entity it was performed on, and the date and time of the action. These records are stored in an "actions" table, an example of which is shown in Table 1.

TABLE 1

| ID | User ID | Entity ID | Action ID | Date |
| --- | --- | --- | --- | --- |
| 1 | 1 | 3 | 1 | 10/09/2011 09:21:16 |
| 2 | 1 | 6 | 7 | 11/09/2011 15:40:21 |
| 3 | 2 | 2 | 5 | 11/09/2011 11:10:25 |
| 4 | 3 | 8 | 3 | 12/09/2011 18:23:31 |

The system also has a table that records the sum totals of the time-dependent "values" for each of these actions, as well as the corresponding user ID and entity ID. This table will be referred to as the "action-values" table, an example of which is shown in Table 2

TABLE 2

| ID | User ID | Entity ID | Action1 | Action2 | Action3 | Action4 | Action5 | Action6 | Action7 | Total |
|---|---|---|---|---|---|---|---|---|---|---|
| 1 | 1 | 3 | 50 | 25 | 36 | null | 20 | 100 | 60 | 291 |
| 2 | 1 | 6 | 45 | 65 | 15 | 10 | 55 | 90 | 46 | 326 |
| 3 | 2 | 2 | 45 | 15 | 65 | 20 | 54 | 180 | 65 | 444 |
| 4 | 3 | 8 | 125 | null | 24 | null | null | 80 | 25 | 254 |
| 5 | 3 | 4 | 80 | null | 45 | 35 | 80 | 45 | 26 | 311 |

On a periodic basis, the system updates this table by querying the "actions" table. The value for each of the actions should be re-calculated according to Equation 1:

$$\sum_{i=1}^{N} C_{action} * D^{-F_{action}}$$

where $C_{action}$ is a coefficient associated with the importance of the associated action, and D is the number of days since the action was performed, and $F_{action}$ is a coefficient associated with the time-dependence of the value for the associated action.

Creating an ad: When an advertiser wants to create an advertisement to be displayed in the system, they select a set of keywords that they would like to associate with the advertisement. For example, an advertisement for a golf shop located in Saint Louis, Mo. might have the following keywords:

golf
golf store
Saint Louis
PGA
golf course
golf club
golf equipment

The advertiser then assigns a set of importance weights to each of these keywords. The total of the weights should sum to 100%. For example:

golf store—30%
golf equipment—25%
Saint Louis—20%
golf—10%
PGA—5%
golf course—5%
golf club—5%

The advertiser can choose as many or as few keywords as they wish, but the weights must always sum to 100%.

Choosing which users to display ads to: What the advertiser can then purchase is the following:

An anonymous list of users and associated information about those users, based on keyword(s)
A service to display ads to those users when they visit.

A key step in this process is first determining which users' activity information to purchase and secondly which of those users to display ads to.

Below is an example of this process, applied for a small highly-targeted advertising campaign, using the golf store example above. Although this advertiser has selected a number of keywords for its ad campaign, for demonstration purposes, we will first show how the process works for a single keyword.

For the single keyword "golf store", the advertiser can purchase an ordered list of users that have recent activity associated with the keyword "golf store". They can choose as many or as few users as they want. For demonstration purposes, let's say they purchase a list of 10 users, as shown in Table 3.

TABLE 3

| ID in list | Value for "golf store" |
|---|---|
| 1 | 1245 |
| 2 | 1156 |
| 3 | 1025 |
| 4 | 1011 |
| 5 | 985 |
| 6 | 952 |
| 7 | 920 |
| 8 | 911 |
| 9 | 905 |
| 10 | 894 |

For each of these users, the advertiser will probably want to know some additional information about the user's interests. By default, the purchase of the list above should include a list of the "top 10" entities for each of the user in the list. For example, for "user 1" in the list, the advertiser would see the following "top 10" list, as shown in Table 4.

TABLE 4

| ID in list | Top entities for ID 1 |
|---|---|
| 1 | golf store |
| 2 | golf equipment |
| 3 | golf courses |
| 4 | tennis |
| 5 | PGA |
| 6 | Tiger Woods |
| 7 | Roger Federer |
| 8 | US Open |
| 9 | Saint Louis |
| 10 | golf |

The advertiser can then decide whether they want to target ads to this user or not, based on the information available in this list. The advertiser can also choose to purchase additional "top entities" from the user, up to some limit specified by the system for privacy reasons.

More complex example, using all of the keywords: The process is the same as above, except the calculation of "value" is instead a weighted value for each of the keywords. From the example above, we saw that "user 1" had value of 1245 for the keyword "golf store". Since for the advertiser, "golf store" has a weight of 30, the weighted value for "golf store" is 30*1245 or 37350. The weighted value for each keyword is calculated as shown in the table below, as well as the final "weighted average," as shown in Table 5.

TABLE 5

| Keyword | Weight | Keyword Value | Weighted Value |
|---|---|---|---|
| Golf store | 30% | 1245 | 373.50 |
| Golf equipment | 25% | 965 | 241.25 |
| Saint Louis | 20% | 1725 | 345.00 |
| golf | 10% | 1520 | 152.00 |
| PGA | 5% | 425 | 21.25 |
| Golf course | 5% | 295 | 14.75 |
| Golf club | 5% | 457 | 22.85 |
| Weighted Average | | | 1170.6 |

Finally, what the advertiser will receive is a list of users, ordered by the weighted average for their set of keywords, similar to the list of users shown above for the single keyword example, as shown in Table 6.

TABLE 6

| ID in list | Weighted Average |
|---|---|
| 1 | 1170.6 |
| 2 | 1136.2 |
| 3 | 1035.4 |
| 4 | 1021.0 |
| 5 | 975.2 |
| 6 | 963.1 |
| 7 | 941.7 |
| 8 | 932.4 |
| 9 | 927.6 |
| 10 | 899.4 |

Again, the advertiser will also receive a "top 10" list of entities for each of the users in the list.

Selecting which users to display advertisements to: Finally, after the advertiser receives a list of users that have high activity in the keywords of their choice, the advertiser can select which of users to display advertisements to. Based on the "top 10" lists, the advertiser can already "weed out" users that they are not interested in. Notice in Table 7 below that several users from the original ten have been removed from the list.

The next step is to see the cost to display ads for each of the users. This is expressed as a price to purchase a percentage of the users "views" per day. For our "golf store" example, the price and the approximate number of views that the targeted users generate per day is shown in Table 7.

TABLE 7

| ID in list | Weighted Average | Price per % of views per day | Approximate views (Impressions) Per Day |
|---|---|---|---|
| 1 | 1170.6 | 0.25 | 150 |
| 2 | 1136.2 | 0.24 | 160 |
| 3 | 1035.4 | 0.35 | 140 |
| 4 | 1021.0 | 0.22 | 180 |
| 6 | 963.1 | 0.45 | 200 |
| 7 | 941.7 | 0.36 | 120 |
| 9 | 927.6 | 0.10 | 220 |

These prices are determined based on the market supply and demand for serving advertisements to those specific users. For example, if there are already a lot of orders for ads to be served to "user 6," the cost of displaying new ads to him or her will be higher than a user who has not generated many ads. If a particular user already has ads representing 100% of his/her views for a particular time period, then the system will indicate to the advertiser that ads for this user are only available after that particular period.

TABLE 8

| ID | ID in list | Weighted Average | Price per % of views per day | Percent ordered | Days | Totals |
|---|---|---|---|---|---|---|
| 1 | 1 | 1170.6 | 0.25 | 25% | 14 | 0.875 |
| 2 | 2 | 1136.2 | 0.24 | 25% | 14 | 0.84 |
| 3 | 3 | 1035.4 | 0.35 | 25% | 14 | 1.225 |
| 4 | 4 | 1021.0 | 0.22 | 20% | 14 | 0.77 |
| 5 | 7 | 941.7 | 0.36 | 20% | 14 | 1.26 |
| 6 | 9 | 927.6 | 0.10 | 20% | 14 | 0.35 |
| | | | Grand Total | | | 5.32 |

For large campaigns: The above example works well for a small business that wants to run a small, highly-targeted ad campaign. Larger companies, however, may not want to devote time and resources to exploring in detail the set of users that they will serve ads to. Thus, the system has a query engine for such companies to quickly perform the following types of queries. For example, "Select top 1000 users for given keywords that have price below 0.30 and only if they have weighted average above 800." Thus it is thus possible to select a large number of users and filter them based on the advertisers' desired criteria.

Experts and Expert Opinions

The disclosed invention contains a process for a user to submit credentials to be designated an expert on a particular subject, through an interface accessed from the World Wide Web.

1. User clicks a "Become an Expert" button.
2. System displays an application form, which consists of three parts:
    a. Subjects for which the user would like to be designated as an expert: In this interface, the user can type in various subjects for which he or she would like to be designated as an expert. These subjects can be existing entities/categories, or the user can create new entities/categories. The user can select as many subjects as he/she wants, but must select at least one subject area.
    b. Submission of expertise credentials: In this interface, the user can submit various forms of credentials that provide evidence of the user's expertise on the above chosen subject areas. This can include uploading of a resume or CV, uploading of a list of publications, links to relevant websites, and references to other known experts who can vouch for the user's expertise in the chosen areas.
    c. Verification of the user's identity: In this interface, the user can verify his or her identify by selecting one of the available verification methods. These can include (but are not limited to): verification by email address, verification by credit card, or verification by submission of identification. Verification by email address will only be allowed for users that have email addresses given by reputable organizations, such as universities, government agencies, and established companies (employee emails only, i.e. no "self-serve" email services). Verification by credit card will be done by submitting credit card information for major credit card companies. Verification by submission of identification will be performed by the user uploading a scanned government-issued form of identification. These scanned forms of identification will then be verified by third-party methods.

3. When the user is finished supplying all of the requested information, he or she clicks "Submit Application."
4. The system then sends the application to an administrator, who reviews the application, and then assigns the user to a particular level of expertise for each of the subject areas to which the user applied, through an administrator interface. The administrator can also choose to reject the application for expertise status for one or more subject areas.
5. When the administrator has completed his or her review and expertise-level assignments, he or she clicks a "Complete Processing" button.
6. If one or more expert-level assignment has been made, the system updates a database table to specify the user as an expert in each of the applicable subject areas and also records the expertise-level. These expertise levels are used to determine the magnitude of effect that this particular user has when he or she confirms or disputes a relationship. For example, the confirmation of a particular relationship by an expert user may have 5 times the effect of a non-expert user confirming the same relationship.
7. Lastly, the administrator sends notification to the user that their application has been processed. The user will have the option to update and/or appeal his or her application, should the user not be satisfied with the administrator's decisions.

Entity Relationship Position Value

The disclosed invention contains a process for users to assign their position concerning a relationship and for calculating a value that represents the relationship's "position value" and sorting relationships by this value, through an interface accessed from the World Wide Web. For any relationship in the system, users have the option to assert a "position" concerning that relationship as either positive or negative (in some embodiments may also be known as "confirm/dispute", "like/dislike," "agree/disagree," "approve/disapprove," etc.). Thus, this process for users to indicate a position and calculating a value based on these user positions consists of the following steps:

1. A user clicks on a "positive" indicator button (i.e. "confirm", "like," "agree", "approve", etc.) for a particular relationship.
2. The system increases the associated relationship's "position value" by a value proportional to the user's "credibility weight", which is a weight determined by the user's expert status concerning that relationship. As described above, some users may attain an expert status that allows for their positive or negative position to have a greater effect on the relationship's "position value" than users without expert status. The determination of a user's expert status concerning a particular relationship is determined according to processes described below.
3. The system also changes the "positive" indicator button in a matter that gives the user the option to remove his or her "positive" position concerning the relationship (e.g. "unconfirm").
4. If the same user clicks this button to remove his or her "positive" position concerning the relationship, the system will decrease the relationship's "position value" by the same amount as described in step 2 above.
5. A user clicks on a "negative" indicator button (i.e., "dispute", "dislike," "disagree", "disapprove", etc.) for a particular relationship.
6. The system decreases the associated relationship's "position value" by an amount according to the user's expert status concerning that relationship, which is determined in the same way as described in step 2 above.
7. The system also changes the "negative" indicator button in a manner that gives the user the option to remove his or her "negative" position concerning the relationship (e.g. "undispute").
8. If the same user clicks this button to remove his or her "negative" position concerning the relationship, the system will increase the relationship's "position value" by the same amount as described in step 6 above.

As described above, the system contains a process for sorting a set of relationships based on the relationships' "position value," comprising the following steps:

1. A user performs a search query or otherwise visits a page containing a list of relationships. In the interface containing this list of relationships, the system contains a button for sorting the relationships by the "position value" (may also be known as "sort by confirmation level," "sort by agreement level," or something similar, as described in process above).
2. The user clicks on this sort button.
3. The system reorders the list of relationships, ordering them from highest "position value" to lowest "position value" (i.e. descending "position value"). The system also modifies the sort button to a button for reversing the sort order to that of ascending "position value".
4. The user clicks on the "reverse sort order" button.
5. The system reorders the list of relationships, ordering them from lowest "position value" to highest "position value" (i.e. ascending "position value"). The system also modifies the sort button to return to its previous state (i.e. descending "position value").

Automatically Designating Experts

The disclosed invention contains a process for automatically designating a user as an "expert" on a particular subject, based on the user's activity. If a user is very "active" in a particular information domain (creating many relationships, confirming or disputing many relationships, following many entities), then it is likely that this user has some level of expertise in that information domain. Based on this likeliness, the system contains a process to analyze this activity and "automatically" assign an expertise level based on this activity.

The means of determining discrete "subject areas" is based on sets of highly "clustered" or connected entities. For example, you might expect the subject area of "astronomy" to contain a highly connected set of relationships containing the following entities:

Planet
Galaxy
Star
Solar System
Telescope
Sun
Black Hole

Thus, the system contains a process for analyzing relationships to determine highly clustered sets of relationships representing discrete subject areas. The names of the subject areas associated with these clustered sets are determined by an administrator, or in some embodiments of the invention, are determined automatically based on which entities occur most frequently in the clustered sets.

For a user to be automatically designated as an "expert" on the subject "astronomy", he or she should have a lot of "activity" involving these entities: for example, creating many relationships containing these entities, confirming or disputing many relationships containing these entities, or following a large number of these entities. Thus, the system contains a process for automatically determining a user's expert status on specific subject areas, which is similar to the process described in process above for determining users' interests. The main difference between these two processes is that, in the "expert designation" process, different weights are assigned to the possible actions that a user can perform. In other words, the weights are adjusted to more closely reflect activities that experts would be expected to perform, for example, creating relationships. Another characteristic that one might expect is that the relationships this user has created in this subject area are confirmed by many other users and disputed by few other users. Thus, the "expert designation" process also differs from process described above, in that the weight applied to creation of relationships is affected by confirmations or disputations of those relationships.

Utilizing the processes described above, the system contains a process to automatically designate certain users as experts on particular subject areas, where the subject areas represent "clusters" of highly connected entities which have been assigned specific subject area names (for example, astronomy). Expert designation follows a process, where each time a user creates a relationship using an entity in this cluster, he or she receives expert "points" for that subject area (for example, 50 points for each relationship created). Each time another user confirms that relationship, the original user (who created the relationship) receives additional points (for example, 2 points). Similarly, each time another user disputes that relationship, the original user loses some amount of expert points (for example, 2 points).

In the same manner, a user receives expert points by following entities in this cluster or confirming/disputing relationships containing entities in this cluster.

Based on this point system, the system categorizes users within this subject area based on the amount of expert points they have accumulated for that subject area. For example, users in the top $1^{st}$ percentile would have a "world-class expert" level, users in the $2^{nd}$ to $10^{th}$ percentile would have a "advanced expert" level, users in the $11^{th}$ to $20^{th}$ percentile would have an "intermediate expert" level, etc. The expert level determines the effect of the expert's "position" on relationships in that subject area, in the same way as described above.

Sandboxes

The disclosed invention contains a process for allowing users to create a "sandbox," which is defined as an area where users can make changes to a certain portion of the entity-relationship database and view the results without committing the changes to the entity-relationship database, through an interface accessed from the World Wide Web, comprising the following steps:
 1. User clicks on a "Create sandbox" button.
 2. The next step in setting up a sandbox is for the user to select relationships to pull into the "sandbox" for modifications. Thus, the system displays a search interface, where the user can perform a search query of relationships.
 3. User performs a search query.
 4. System displays the search results along with checkboxes to select which of the relationships to bring into the "sandbox".
 5. User selects one or more relationships to bring into the "sandbox".
 6. User clicks a "View sandbox" button.
 7. System displays a list of the relationships the user has selected to bring into the "sandbox," which are displayed in "editable" mode.
 8. User edits one or more relationships in the sandbox.
 9. When the user has finished making his or her edits, he clicks a "Save sandbox" button.
 10. System saves the current state of the sandbox.

The disclosed invention contains a process for a user to merge a "sandbox" back into the full entity-relationship database, through an interface accessed from the World Wide Web, comprising the following steps:
 1. From the user's "sandbox view", he or she clicks a "Merge sandbox" button.
 2. System displays an interface for merging the user's sandbox into the system's database of entity-relationships, which includes a list of the user's modifications to the relationships, including the original forms of the relationship, and options to merge either individual modifications or merge all modifications as a batch process.
 3. User selects one or more modifications to merge into the system, or chooses the option to merge all modifications as a batch process.
 4. In some embodiments of the system, there may be an approval process for making changes to existing relationships in the system (for this, refer to the "workflow" control process described below). In these cases, the system will send notification(s) to the user or users who must approve the modifications prior to them being incorporated into the system.
 5. Once all required approval requirements have been met, the system saves the modified relationship(s) into the system and updates the "updated at" attribute of the relationship. A record of the modification is also stored in a separate database table with information sufficient to "undo" the modification at a later date.

Controlling Workflow—Approving Changes

The disclosed invention contains a process for controlling the "workflow" of approval of changes to the entity-relationship database, through an interface accessed from the World Wide Web, comprising the following steps:
 1. As described above, the system sends notifications (via e-mail, or via messages inside the web-based system) to the user or set of users that must approve a modification to a relationship or set of relationships stored in the system. In some embodiments of the system, there may be a sequence of "approvers" that must approve changes before the modifications are finally adopted into the system. In this description, we describe the process for two such "approvers," although there may be as few as one approver or as many as may be desired by the users of the system.
 2. A user who receives a notification of a modification may at any time click on a link in the notification to see the current status of the proposed modifications.
 3. In response to such a request, the system displays information about the proposed modification, such as the original and proposed form of the relationship, the user who proposed the change, the time and date the change was proposed, the ordered list of users who must approve the changes and the current status of their approval, the overall status of the proposed change, and any comments stored by users regarding the proposed change.
 4. For the first user in the "approver" list, the system displays next to his or her username in the ordered list of "approvers" a set of options to approve, disapprove, modify, or comment on the proposed change.
 5. This user selects his or her desired response to the proposed change (approve, disapprove, modify, or comment). If the user selects "modify" or "comment", the user must also enter his or her modifications or comments, as appropriate.

6. After the user has entered his or her desired response, the system sends a notification to both the "proposer" of the change and the next user in the ordered list of "approvers," containing information about the user's response.

7. If the response of the first "approver" was either a rejection or modification of the proposed change, the original "proposer" of the change has an opportunity to either modify the original proposed change or to accept or reject the first approver's modification to the change. For the purposes of this description, it is assumed the first "approver" has either approved the original proposed change, or the "proposer" has modified his or her change to be acceptable to the "first approver".

8. The next user in the "approver" list clicks on a link in the notification to view the current status of the proposed modification.

9. The system displays the current information associated with the proposed modification, similarly to what is described in step 3.

10. For the second user in the "approver" list, the system displays next to his or her username in the ordered list of "approvers" a set of options to approve, disapprove, modify, or comment on the proposed change.

11. This user selects his or her desired response to the proposed change (approve, disapprove, modify, or comment). If the user selects "modify" or "comment", the user must also enter his or her modifications or comments, as appropriate.

12. If this user is the final user in the "approvers" list (as assumed to be the case in this description), the system sends a notification to all the "approvers" in the list, as well as to the "proposer."

13. If the status of the proposed change is "approved", the system incorporates the change into the system, as described in step 5 of the sandbox "merging" process described before.

14. If the status of the proposed change is "rejected", then the proposer has the opportunity to modify his or her change, which would cause the approval process to be reinitiated.

Geolocation

The disclosed invention contains a process for displaying results based on the geolocation (position) of the user, as indicated by the user or by a positioning device supplying data to the system, through an interface accessed from the World Wide Web, comprising the following steps:

1. User clicks on a button "sort by location".
2. System receives the user's current position, either supplied by a positioning device attached to the system, or by a separate information service knowing the user's position. If the user's position is not known, the system asks the user to enter his or her current position by displaying an interface for entering one's position.
3. If the user is asked by the system for his or her current position, the user enters his or her position in a form of his or her choice (e.g. "St. Louis", "United States", "38° 35' N, 9° 12' W", etc.)
4. System displays a list of relationships that are associated with the user's location. The possible location associations include, but are not limited to:
   a. Location of the user who created the entity (if known)
   b. Location of entities contained in the relationship, if known. For example, the relationship "St. Louis is a city" might be included in the list, if the user's current location is in or near the city St. Louis.

Relationships are sorted from "nearest" to "furthest," based on the distance between the user's location and the location associated with the relationship. For relationships that have an equal distance value, a secondary sorting criteria is used, as determined by the user's sorting preferences (e.g. default sorting has been set to "time descending," so secondary sorting criteria is the time that the relationship was created in descending order). In some embodiments of the invention "specificity" may also be used as a sorting criteria. For example, the relationship "St. Louis is a city," in addition to a location parameter, may also have a specificity parameter of 50 km. Thus, the system could use specificity as a secondary sorting criteria to show relationships with an associated location that are both near to the user and having a high level of specificity.

Groups of Users

The disclosed invention contains a process for grouping users into user groups, through an interface accessed from the World Wide Web, comprising the following steps:

1. User clicks an "Add Group" button.
2. System displays a set of groups for the user to choose from, including information about the groups, such as total number of members, total number of relationships associated with the group, and the most recent relationship associated with the group.
3. User clicks on the "join" button for a particular group.
4. System adds the user to the group membership list.

The disclosed invention contains a process for viewing relationships created or modified by a particular user or group of users, through an interface accessed from the World Wide Web, comprising the following steps:

1. User clicks on a link corresponding to a particular user or group of users.
2. System displays a list of relationships associated with the selected user or group of users, as well as information about the user or group of users, such as total number of relationships created, entities most commonly used by the user or group of users, and number of relationships confirmed or disputed.

Flowchart and System Diagram of an Illustrative Embodiment

Figure 12:
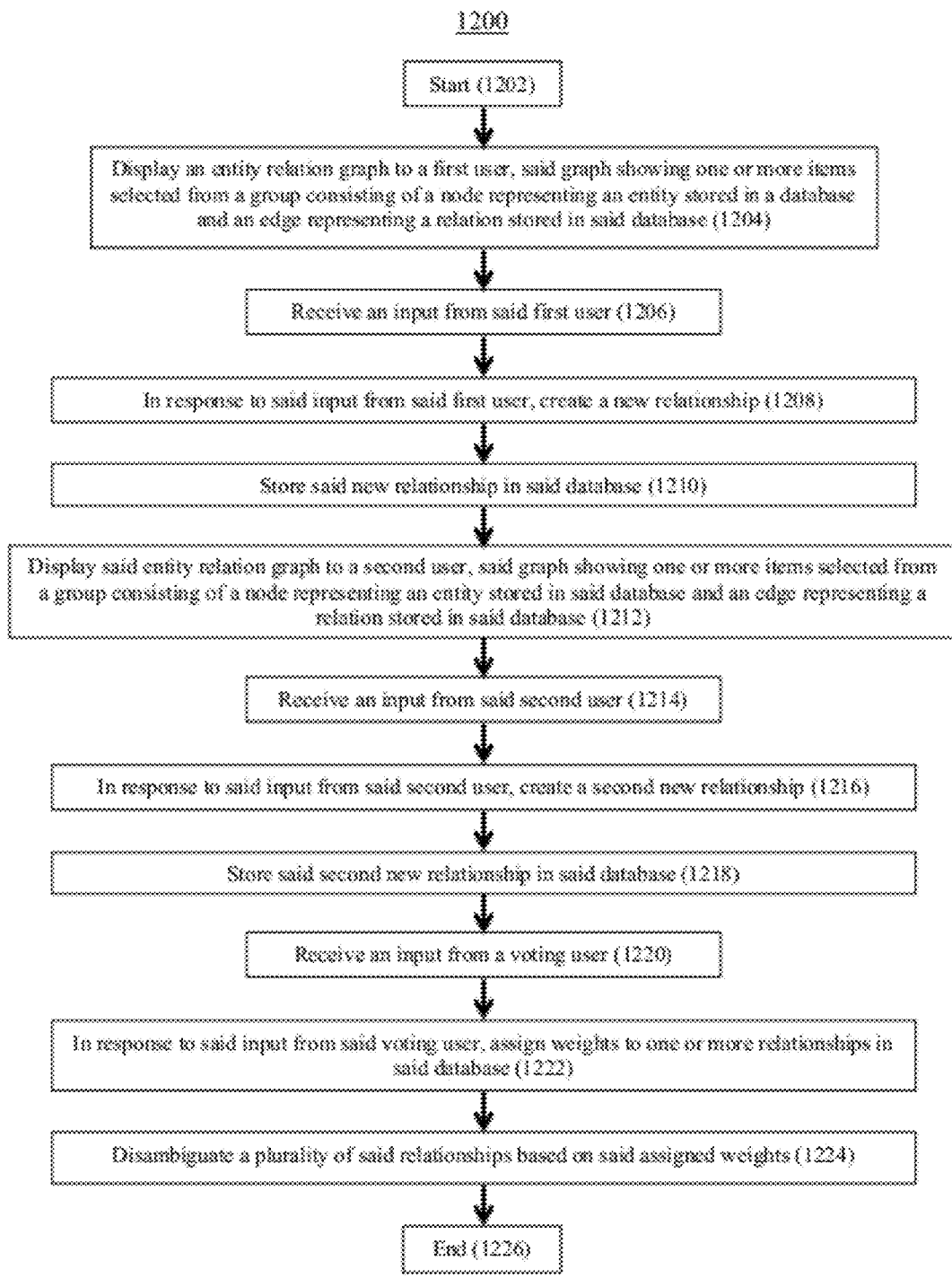
FIG. 12 illustrates a flowchart of a process of one embodiment of the present invention.

Accordingly, FIG. 12 illustrates a flowchart 1200 of a process of one embodiment of the present invention. The process starts at step 1202, which then proceeds to step 1204, displaying an entity-relationship graph to a first user, said graph showing one or more items selected from a group consisting of nodes representing entities stored in a database and edges representing relations stored in said database. The process then proceeds to step 1206, receiving an input from said first user. The process then proceeds to step 1208, in response to said input from said first user, creating a new relationship. The process then proceeds to step 1210, storing said new relationship in said database. The process then proceeds to step 1212, displaying said entity-relationship graph to a second user, said graph showing one or more items selected from a group consisting of nodes representing entities stored in said database and edges representing relations stored in said database. The process then proceeds to step 1214, receiving an input from said second user. The process then proceeds to step 1216, in response to said input from said second user, creating a second new relationship. The process then proceeds to step 1218, storing said second new relationship in said database. The process then proceeds to step 1220, receiving an input from a voting user. The process then proceeds to step 1222, in response to said input from said voting user, assigning weights to one or more relationships in said database. The process then proceeds to step 1224, disambiguating a plurality of said relationships based on said assigned weights. The end of the process is achieved at step 1226.

Figure 13:
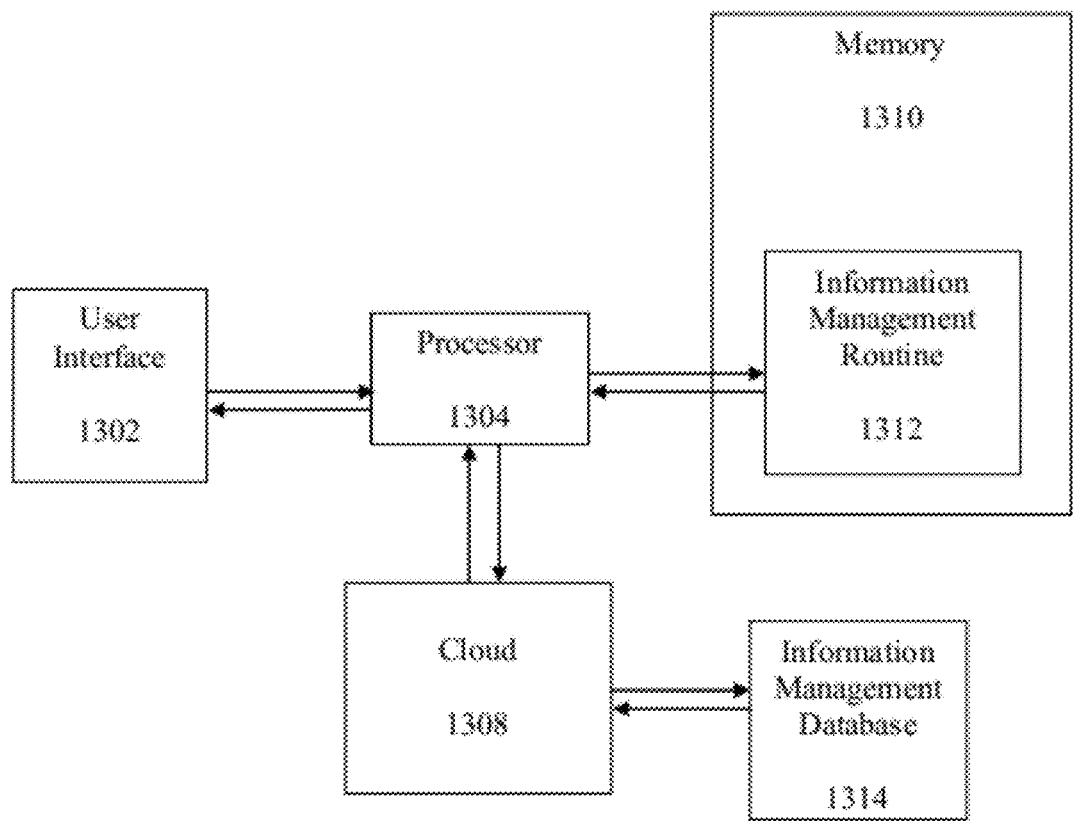
FIG. 13 illustrates a system according to one embodiment in which the present invention may be practiced.

FIG. 13 illustrates a system 1300 according to one embodiment in which the present invention may be practiced. The system includes a user interface 1302, which may be displayed to a user of the system through a display device. The system also includes a processor 1304, operatively connected to memory unit 1310. The memory unit 1310 has loaded information management routine 1312, which when executed causes the system to perform a process comprising the steps of displaying an entity-relationship graph to a first user, said graph showing one or more items selected from a group consisting of nodes representing entities stored in a database and edges representing relations stored in said database; receiving an input from said first user; in response to said input from said first user, creating a new relationship; storing said new relationship in said database; displaying said entity-relationship graph to a second user, said graph showing one or more items selected from a group consisting of nodes representing entities stored in said database and edges representing relations stored in said database; receiving an input from said second user; in response to said input from said second user, creating a second new relationship; storing said second new relationship in said database; receiving an input from a voting user; in response to said input from said voting user, assigning weights to one or more relationships in said database; and disambiguating a plurality of said relationships based on said assigned weights. Finally, system 1300 includes a connection between processor 1304 and a cloud 1308. This cloud may, for example, be a network connection to the Internet, connecting the processor 1304 to a remote information management database 1314 where information management data, such as entities and relationships, are stored and referenced.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the scope of the present invention as defined by the claims.

What is claimed is:

1. A computer-implemented method of collaboratively managing an entity-relationship database, comprising:
    displaying an entity-relationship graph showing a graphical representation of the entity-relationship database to a first user, said graph comprising a plurality of nodes representing entities stored in the entity-relationship database and a plurality of edges representing relations stored in said entity-relationship database;
    creating a first new relationship in the entity-relationship database in response to an input from said first user, generating an updated version of said entity-relationship graph;
    displaying the updated entity-relationship graph to a second user;
    creating a second new relationship using the updated version of the entity-relationship graph in the entity-relationship database in response to an input from said second user;
    assigning a voting weight to the first or the second relationships relative to another relationship in said entity-relationship database in response to an input from a voting user;
    collecting data on expert status of the voting user, said expert status indicating whether the voting user is an expert on a given topic;
    assigning a credibility weight to the voting weight from the voting user based on the expert status of the voting user;
    disambiguating the first and the second relationship relative to other relationships in the entity-relationship database based on said voting weight and said credibility weight; and
    storing the first new relationship and the second new relationship in the entity-relationship database and a result from the disambiguating step in memory.

2. The method of claim 1, further comprising:
    calculating a relationship path between two entities stored in said entity-relationship database.

3. The method of claim 2, wherein the relationship path is displayed on said entity-relationship graph as a chain of nodes and edges.

4. The method of claim 1, wherein said input from said voting user is represented by an indication of the voting user's opinion about the one or more relationships.

5. The method of claim 1, further comprising:
    collapsing said entity-relationship database by replacing two or more of the relationships in the entity-relationship database with a single relationship.

6. The method of claim 1, wherein said second new relationship represents a modification to said first new relationship.

7. The method of claim 1, further comprising:
    displaying to an advertiser an ordered list of viewing users that have recent activity associated with a predetermined keyword, weighted by an importance weight of the keyword to the advertiser.

8. The method of claim 7, further comprising:
    displaying to the advertiser a price to display an advertisement to each viewing user on the ordered list of viewing users, said price based on a market supply and demand for serving advertisements to said viewing users.

9. The method of claim 1, further comprising:
    receiving an input from the voting user indicating that the voting user would like to be designated as an expert;
    receiving credentials from said voting user to substantiate the voting user's expertise; and assigning the credibility weight to the voting weight from the voting user based on the received credentials.

10. A computer system for collaboratively managing an entity-relationship database, the system comprising:
    one or more memories for storing program code;
    one or more communication links to the entity-relationship database; and
    one or more processors, operatively connected to the one or more memories, for executing the stored program code, which when executed causes the system to perform a process comprising the steps of:
        displaying an entity-relationship graph showing a graphical representation of the entity-relationship database to a first user, said graph comprising a plurality of nodes representing entities stored in the entity-relationship database and a plurality of edges representing relations stored in said entity-relationship database;

creating a first new relationship in the entity-relationship database in response to an input from said first user, generating an updated version of said entity-relationship graph;

displaying the updated entity-relationship graph to a second user;

creating a second new relationship using the updated version of the entity-relationship graph in the entity-relationship database in response to an input from said second user;

assigning a voting weight to the first or the second relationships relative to another relationship in said entity-relationship database in response to an input from a voting user;

collecting data on expert status of the voting user, said expert status indicating whether the voting user is an expert on a given topic;

assigning a credibility weight to the voting weight from the voting user based on the expert status of the voting user;

disambiguating the first and the second relationship relative to other relationships in the entity-relationship database based on said voting weight and said credibility weight; and storing the first new relationship and the second new relationship in the entity-relationship database and a result from the disambiguating step in memory.

11. The computer system of claim 10, wherein the stored program code when executed further causes the system to perform the step of:
calculating a relationship path between two entities stored in said entity-relationship database.

12. The computer system of claim 11, wherein the relationship path is displayed on said entity-relationship graph as a chain of nodes and edges.

13. The computer system of claim 10, wherein said input from said voting user is represented by an indication of the voting user's opinion about the one or more relationships.

14. The computer system of claim 10, wherein the stored program code when executed further causes the system to perform the step of:
collapsing said entity-relationship database by replacing two or more of the relationships in the entity-relationship database with a single relationship.

15. The computer system of claim 10, wherein said second new relationship represents a modification to said first new relationship.

16. The computer system of claim 10, wherein the stored program code when executed further causes the system to perform the step of:
displaying to an advertiser an ordered list of viewing users that have recent activity associated with a predetermined keyword, weighted by an importance weight of the keyword to the advertiser.

17. The computer system of claim 16, wherein the stored program code when executed further causes the system to perform the step of:
displaying to the advertiser a price to display an advertisement to each viewing user on the ordered list of viewing users, said price based on a market supply and demand for serving advertisements to said viewing users.

18. The computer system of claim 10, wherein the stored program code when executed further causes the system to perform the steps of:
receiving an input from the voting user indicating that the voting user would like to be designated as an expert;
receiving credentials from said voting user to substantiate the voting user's expertise; and
assigning the credibility weight to the voting weight from the voting user based on the received credentials.

* * * * *